US 8,250,587 B2

(12) United States Patent
Zeldin et al.

(10) Patent No.: US 8,250,587 B2
(45) Date of Patent: Aug. 21, 2012

(54) NON-PERSISTENT AND PERSISTENT INFORMATION SETTING METHOD AND SYSTEM FOR INTER-PROCESS COMMUNICATION

(75) Inventors: Paul E. Zeldin, Los Altos, CA (US); Joseph P. Williams, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 1101 days.

(21) Appl. No.: 11/588,848

(22) Filed: Oct. 26, 2006

(65) Prior Publication Data

US 2007/0106722 A1 May 10, 2007

Related U.S. Application Data

(60) Provisional application No. 60/732,038, filed on Oct. 27, 2005.

(51) Int. Cl.
G06F 3/00 (2006.01)
G06F 17/26 (2006.01)

(52) U.S. Cl. ........ 719/313; 719/328; 719/311; 715/234; 715/239

(58) Field of Classification Search .................. None
See application file for complete search history.

(56) References Cited

U.S. PATENT DOCUMENTS

| 3,641,433 A | 2/1972 | Mifflin et al. |
| 4,168,400 A | 9/1979 | De Couasnon et al. |
| 4,176,316 A | 11/1979 | DeRosa et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |

(Continued)

FOREIGN PATENT DOCUMENTS

WO    WO94/03986    2/1994

(Continued)

OTHER PUBLICATIONS

Java 2 Platform, Standard Edition, V 1.4.2 API specification, 2003, Sun Microsystem, pp. 1-23.*

(Continued)

*Primary Examiner* — Andy Ho
*Assistant Examiner* — Tuan Dao

(57) ABSTRACT

System, method, architecture, network device, and computer programs and computer program products for inter-process communications. Message structure, procedure for generating the message structure, applications of the message structure and messaging method for obtaining status, statistics, and other information and for performing an information or parameter set operation across one or more process boundaries, and to other device and system architectures and methods for utilizing the messages and messaging methodology.

54 Claims, 10 Drawing Sheets

U.S. PATENT DOCUMENTS

| | | | |
|---|---|---|---|
| 4,707,839 A | 11/1987 | Andren et al. | |
| 4,730,340 A | 3/1988 | Frazier | |
| 4,736,095 A | 4/1988 | Shepard et al. | |
| 4,740,792 A | 4/1988 | Sagey et al. | |
| 4,758,717 A | 7/1988 | Shepard et al. | |
| 4,760,586 A | 7/1988 | Takeda | |
| 4,789,983 A | 12/1988 | Acampora et al. | |
| 4,829,540 A | 5/1989 | Waggener et al. | |
| 4,850,009 A | 7/1989 | Zook et al. | |
| 4,872,182 A | 10/1989 | Mcrae et al. | |
| 4,894,842 A | 1/1990 | Brockhaven et al. | |
| 4,901,307 A | 2/1990 | Gilhousen et al. | |
| 4,933,952 A | 6/1990 | Albrieux et al. | |
| 4,933,953 A | 6/1990 | Yagi | |
| 4,995,053 A | 2/1991 | Simpson et al. | |
| 5,008,899 A | 4/1991 | Yamamoto | |
| 5,029,183 A | 7/1991 | Tymes | |
| 5,103,459 A | 4/1992 | Gilhousen et al. | |
| 5,103,461 A | 4/1992 | Tymes | |
| 5,109,390 A | 4/1992 | Gilhousen et al. | |
| 5,142,550 A | 8/1992 | Tymes | |
| 5,151,919 A | 9/1992 | Dent | |
| 5,157,687 A | 10/1992 | Tymes | |
| 5,187,575 A | 2/1993 | Dent et al. | |
| 5,231,633 A | 7/1993 | Hluchyj et al. | |
| 5,280,498 A | 1/1994 | Tymes et al. | |
| 5,285,494 A | 2/1994 | Sprecher et al. | |
| 5,329,531 A | 7/1994 | Diepstraten | |
| 5,418,812 A | 5/1995 | Reyes et al. | |
| 5,444,851 A | 8/1995 | Woest | |
| 5,448,569 A | 9/1995 | Huang et al. | |
| 5,450,615 A | 9/1995 | Fortune et al. | |
| 5,465,401 A | 11/1995 | Thompson | |
| 5,479,441 A | 12/1995 | Tymes et al. | |
| 5,483,676 A | 1/1996 | Mahany et al. | |
| 5,491,644 A | 2/1996 | Pickering et al. | |
| 5,517,495 A | 5/1996 | Lund | |
| 5,519,762 A | 5/1996 | Bartlett | |
| 5,528,621 A | 6/1996 | Heiman et al. | |
| 5,561,841 A | 10/1996 | Markus | |
| 5,568,513 A | 10/1996 | Croft et al. | |
| 5,584,048 A | 12/1996 | Wieczorek | |
| 5,598,532 A | 1/1997 | Liron | |
| 5,604,869 A * | 2/1997 | Mincher et al. | 709/232 |
| 5,630,207 A | 5/1997 | Gitlin et al. | |
| 5,640,414 A | 6/1997 | Blakeney et al. | |
| 5,649,289 A | 7/1997 | Wang et al. | |
| 5,668,803 A | 9/1997 | Tymes et al. | |
| 5,793,303 A | 8/1998 | Koga | |
| 5,794,128 A | 8/1998 | Brockel et al. | |
| 5,796,839 A * | 8/1998 | Ishiguro | 380/44 |
| 5,812,589 A | 9/1998 | Sealander et al. | |
| 5,815,811 A | 9/1998 | Pinard et al. | |
| 5,828,960 A | 10/1998 | Tang et al. | |
| 5,838,907 A | 11/1998 | Hansen | |
| 5,844,900 A | 12/1998 | Hong et al. | |
| 5,852,722 A | 12/1998 | Hamilton | |
| 5,872,968 A | 2/1999 | Knox et al. | |
| 5,875,179 A | 2/1999 | Tikalsky | |
| 5,896,561 A | 4/1999 | Schrader et al. | |
| 5,915,214 A | 6/1999 | Reece et al. | |
| 5,920,821 A | 7/1999 | Seazholtz et al. | |
| 5,933,607 A | 8/1999 | Tate et al. | |
| 5,949,988 A | 9/1999 | Feisullin et al. | |
| 5,953,669 A | 9/1999 | Stratis et al. | |
| 5,960,335 A | 9/1999 | Umemoto et al. | |
| 5,980,078 A | 11/1999 | Krivoshein et al. | |
| 5,982,779 A | 11/1999 | Krishnakumar et al. | |
| 5,987,062 A | 11/1999 | Engwer et al. | |
| 5,987,328 A | 11/1999 | Ephremides et al. | |
| 6,005,853 A | 12/1999 | Wang et al. | |
| 6,011,784 A | 1/2000 | Brown | |
| 6,012,088 A | 1/2000 | Li et al. | |
| 6,029,196 A | 2/2000 | Lenz | |
| 6,078,568 A | 6/2000 | Wright | |
| 6,088,591 A | 7/2000 | Trompower | |
| 6,119,009 A | 9/2000 | Baranger et al. | |
| 6,160,804 A | 12/2000 | Ahmed et al. | |
| 6,177,905 B1 | 1/2001 | Welch | |
| 6,188,694 B1 | 2/2001 | Fine et al. | |
| 6,199,032 B1 | 3/2001 | Anderson | |
| 6,208,629 B1 | 3/2001 | Jaszewski et al. | |
| 6,208,841 B1 | 3/2001 | Wallace et al. | |
| 6,218,930 B1 | 4/2001 | Katzenberg et al. | |
| 6,240,078 B1 | 5/2001 | Kuhnel et al. | |
| 6,240,083 B1 | 5/2001 | Wright | |
| 6,256,300 B1 | 7/2001 | Ahmed et al. | |
| 6,256,334 B1 | 7/2001 | Adachi | |
| 6,256,676 B1 * | 7/2001 | Taylor et al. | 709/246 |
| 6,285,662 B1 | 9/2001 | Watannabe | |
| 6,317,599 B1 | 11/2001 | Rappaport et al. | |
| 6,336,035 B1 | 1/2002 | Somoza et al. | |
| 6,336,152 B1 | 1/2002 | Richman et al. | |
| 6,347,091 B1 | 2/2002 | Wallentin et al. | |
| 6,356,758 B1 | 3/2002 | Almeida et al. | |
| 6,393,290 B1 | 5/2002 | Ufongene | |
| 6,404,772 B1 | 6/2002 | Beach et al. | |
| 6,473,449 B1 | 10/2002 | Cafarella et al. | |
| 6,493,679 B1 | 12/2002 | Rappaport et al. | |
| 6,496,290 B1 | 12/2002 | Lee | |
| 6,512,916 B1 | 1/2003 | Forbes, Jr. | |
| 6,580,700 B1 | 6/2003 | Pinard et al. | |
| 6,587,680 B1 | 7/2003 | Ala-Laurila et al. | |
| 6,614,787 B1 | 9/2003 | Jain et al. | |
| 6,625,454 B1 | 9/2003 | Rappaport et al. | |
| 6,631,267 B1 | 10/2003 | Clarkson et al. | |
| 6,659,947 B1 | 12/2003 | Carter et al. | |
| 6,687,498 B2 | 2/2004 | McKenna et al. | |
| 6,699,241 B2 | 3/2004 | Rappaport et al. | |
| 6,725,260 B1 | 4/2004 | Philyaw | |
| 6,747,961 B1 | 6/2004 | Ahmed et al. | |
| 6,839,338 B1 | 1/2005 | Amara et al. | |
| 6,860,685 B2 | 3/2005 | Thomson et al. | |
| 6,879,812 B2 | 4/2005 | Agrawal et al. | |
| 6,901,439 B1 | 5/2005 | Bonasia et al. | |
| 6,938,079 B1 | 8/2005 | Anderson et al. | |
| 6,973,622 B1 | 12/2005 | Rappaport et al. | |
| 6,978,301 B2 | 12/2005 | Tindal | |
| 7,020,773 B1 | 3/2006 | Otway et al. | |
| 7,028,312 B1 | 4/2006 | Merrick et al. | |
| 7,110,756 B2 | 9/2006 | Diener | |
| 7,159,016 B2 | 1/2007 | Baker | |
| 7,310,664 B1 | 12/2007 | Merchant et al. | |
| 7,458,082 B1 * | 11/2008 | Slaughter et al. | 719/328 |
| 7,526,542 B2 | 4/2009 | Booman et al. | |
| 7,607,136 B2 | 10/2009 | Kuno et al. | |
| 2002/0040352 A1 * | 4/2002 | McCormick | 705/80 |
| 2002/0052205 A1 | 5/2002 | Belostofsky et al. | |
| 2002/0069278 A1 | 6/2002 | Forslow | |
| 2002/0095486 A1 | 7/2002 | Bahl | |
| 2002/0101868 A1 | 8/2002 | Clear et al. | |
| 2002/0174137 A1 | 11/2002 | Wolff et al. | |
| 2002/0191572 A1 | 12/2002 | Weinstein et al. | |
| 2003/0014646 A1 | 1/2003 | Buddhikot et al. | |
| 2003/0018661 A1 * | 1/2003 | Darugar | 707/500 |
| 2003/0018889 A1 | 1/2003 | Burnett et al. | |
| 2003/0107590 A1 | 6/2003 | Levillain et al. | |
| 2003/0167444 A1 * | 9/2003 | Zorc | 715/513 |
| 2003/0174706 A1 | 9/2003 | Shankar et al. | |
| 2004/0025044 A1 | 2/2004 | Day | |
| 2004/0047320 A1 | 3/2004 | Eglin | |
| 2004/0054569 A1 * | 3/2004 | Pombo et al. | 705/7 |
| 2004/0064560 A1 | 4/2004 | Zhang et al. | |
| 2004/0095914 A1 | 5/2004 | Katsube et al. | |
| 2004/0095932 A1 | 5/2004 | Astarabadi et al. | |
| 2004/0120370 A1 | 6/2004 | Lupo | |
| 2004/0123302 A1 * | 6/2004 | Lo et al. | 719/310 |
| 2004/0143428 A1 | 7/2004 | Rappaport et al. | |
| 2004/0230370 A1 | 11/2004 | Tzamaloukas | |
| 2004/0259555 A1 | 12/2004 | Rappaport et al. | |
| 2005/0030929 A1 | 2/2005 | Swier et al. | |
| 2005/0050540 A1 * | 3/2005 | Shaughnessy et al. | 718/1 |
| 2005/0058132 A1 | 3/2005 | Okano et al. | |
| 2005/0059405 A1 | 3/2005 | Thomson et al. | |
| 2005/0059406 A1 | 3/2005 | Thomson et al. | |
| 2005/0064873 A1 | 3/2005 | Karaoguz et al. | |
| 2005/0068925 A1 | 3/2005 | Palm et al. | |

| | | |
|---|---|---|
| 2005/0073980 A1 | 4/2005 | Thomson et al. |
| 2005/0128989 A1 | 6/2005 | Bhagwat et al. |
| 2005/0157730 A1 | 7/2005 | Grant et al. |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0240665 A1 | 10/2005 | Gu et al. |
| 2005/0243737 A1 | 11/2005 | Dooley et al. |
| 2005/0256931 A1* | 11/2005 | Follmeg et al. ............... 709/206 |
| 2005/0259597 A1 | 11/2005 | Benedetotto et al. |
| 2005/0273442 A1 | 12/2005 | Bennett et al. |
| 2005/0276218 A1 | 12/2005 | Ooghe et al. |
| 2005/0278614 A1* | 12/2005 | Aizikowitz et al. ........ 715/501.1 |
| 2006/0045050 A1 | 3/2006 | Floros et al. |
| 2006/0088050 A1* | 4/2006 | Kumar et al. ................. 370/465 |
| 2006/0200862 A1 | 9/2006 | Olson et al. |
| 2006/0265689 A1 | 11/2006 | Kuznetsov et al. |
| 2007/0025306 A1 | 2/2007 | Cox et al. |
| 2007/0027964 A1 | 2/2007 | Herrod et al. |
| 2007/0106778 A1 | 5/2007 | Zeldin et al. |
| 2007/0106998 A1 | 5/2007 | Zeldin et al. |
| 2008/0215613 A1* | 9/2008 | Grasso ...................... 707/103 R |

FOREIGN PATENT DOCUMENTS

| | | |
|---|---|---|
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew. S.
Puttini, R., Percher, J., Me, L., and de Sousa, R. 2004. A Fully distributed IDS for MANET. In *Proceeding of the Ninth international Symposium on Computers and Communications 2004* vol. 2 (*Iscc″04*)—vol. 02 (Jun. 28-Jul. 1, 2004). ISCC. IEEE Computer Society, Washington, DC, 331-338.
The International Search Report and Written Opinion for PCT application PCT/US2007/012016, 8 pages, Search Report dated Jan. 4, 2008.
International Search Report PCT/US2007/012016 dated Jan. 4, 2008.
International Search Report PCT/US2007/012194 dated Feb. 4, 2008.
International Search Report PCT/U82007/012195 dated Mar. 19, 2008,.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.

Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
Written Opinion PCT/US2007/012016 dated Jan. 4, 2008.
Written Opinion PCT/US2007/012194 dated Feb. 4, 2008.
Written Opinion PCT/US2007/012195 dated Mar. 19, 2008.
Co-pending U.S. Appl. No. 11/588,849, filed Oct. 26, 2006.
Non-Final Office Action Mailed Jan. 22, 2010 in Co-pending U.S. Appl. No. 11/588,849, filed Oct. 26, 2006.
Co-pending Patent U.S. Appl. No. 11/588,878, filed Oct. 26, 2006.
Non-Final Office Action Mailed May 13, 2010 in Co-pending U.S. Appl. No. 11/588,878, filed. Oct. 26, 2006.
Co-pending U.S. Appl. No. 11/437,537, filed May 19, 2006.
Final Office Action Mailed Jul. 16, 2009 in Co-pending U.S. Appl. No. 11/437,537, filed May 19, 2006.
Non-Final Office Action Mailed Dec. 23, 2008 in Co-pending U.S. Appl. No. 11/437,537, filed May 19, 2006.
Co-pending U.S. Appl. No. 11/437,538, filed May 19, 2006.
Non-Final Office Action Mailed Dec. 22, 2008 in Co-pending U.S. Appl. No. 11/437,538, filed May 19, 2006.

Final Office Action Mailed Jun. 10, 2009 in Co-pending U.S. Appl. No. 11/437,538, filed May 19, 2006.
Co-pending U.S. Appl. No. 11/437,387, filed May 19, 2006.
Final Office Action Mailed Jul. 15, 2009 in Co-pending U.S. Appl. No. 11/437,387, filed May 19, 2006.
Non-Final Office Action Mailed Dec. 23, 2008 in Co-pending U.S. Appl. No. 11/437,387, filed May 19, 2006.
Co-pending U.S. Appl. No. 11/437,582, filed May 19, 2006.
Final Office Action Mailed Jul. 22, 2009 in Co-pending U.S. Appl. No. 11/437,582, filed May 19, 2006.
Non-Final Office Action Mailed Jan. 8, 2009 in Co-pending U.S. Appl. No. 11/437,582, filed May 19, 2006.
Co-pending U.S. Appl. No. 12/683,281, filed Jan. 6, 2010.
R. Fielding et al., Hypertext Transfer Protocol—HTTP/1.1, Sep. 2004, http://www.w3.org/Protocols/rfc2616/rfc2616.html, retrieved Apr. 2010.
JSON-RPC Specification, Jun. 2004, http://web.archive.org/web/20050127014736/www.json-rpc.org/specs.xhtml, retrieved Apr. 2010.
Flux Research Group, Flick: The Flexible IDL Compiler Kit Version 2.1, Programmer's Manual, Chapter 7, Nov. 1999, http://www.cs.utah.edu/flux/flick/current/docs/guts/gutsch7.html, retrieved Apr. 2010.
Bryan Henderson; User manual for XML-RPC for C/C++; http://web.archive.org/web/20050216042635/http://xmlrpc-c.sourceforge.net/doc/; archived Feb. 16, 2005; retrieved Nov. 9, 2010; 7 pages.
Final Office Action for U.S. Appl. No. 11/588,878, mailed Nov. 26, 2010.

\* cited by examiner

```
                    4        4        4        4        4        4
                 +--------------------------------------------------*
     STAT_hdr   | length | seqnum | num_rec | flags | result | lastrec |
                 +--------------------------------------------------+
``` length:  Total number of octets in the message, not including the STAT hdr seqnum:  Ever-increasing message sequence number num_rec: Total number of records included in the message.
         Does not include keys.

flags:   bit 0 = exact_next.  0=Get-Exact, 1=Get-Next.
         bit 1 = first.       1=first, 0=not first.

result:  Returned result from operation.  Only used in response message lastrec: Offset to the last record in the message.  Counted as the number
         of bytes from the start of the message body, where the message
         body starts immediately after the message header.

*FIG. 8*

```
                   var       4       var      var              var
     STAT         +--------------------------------------------------*
     record/key  | msg_type | num_par | par_i | par_j | ... | par_n |
                 +--------------------------------------------------+
``` msg_type: len/string defining the type of generic message num_par:  Number of parameters in the record/key param:    Parameters encoded with ID/type/len/value

*FIG. 9*

```
                         24      var
                     +-----------------+
     NPS_REQUEST     |  NPS_hdr | key_i |
                     +-----------------+
```

FIG. 11(a)

```
                         24      var    var          var      var
                     +------------------------------------------------*
     NPS_RESPONSE    |  NPS_hdr | rec_i | rec_j | ... | rec_n | key_n |
                     +-----------------------------------------------+
```

FIG. 11(b)

```
                     4       4       4        4       4        4
                  +----------------------------------------------------*
     NPS_hdr      | length | seqnum | num_rec | flags | result | lastrec |
                  +---------------------------------------------------+
``` length:   Total number of octets in the message, not including the NPS hdr seqnum:   Ever-increasing message sequence number num_rec:  Total number of records included in the message.
          Does not include keys.

flags:    bit 0 = exact_next.  0=Get-Exact, 1=Get-Next.
          bit 1 = first.       1=first, 0=not first.

result:   Returned result from operation.  Only used in response message lastrec:  Offset to the last record in the message.  Counted as the number
          of bytes from the start of the message body, where the message
          body starts immediately after the message header.

FIG. 12

```
              var       4        var    var          var
NPS          +------------------------------------------*
record/key   | msg_type | num_par | par_i | par_j | ... | par_n |
             +------------------------------------------+
``` msg_type:  len/string defining the type of generic message num_par:   Number of parameters in the record/key param:     Parameters encoded with ID/type/len/value

NON-PERSISTENT AND PERSISTENT INFORMATION SETTING METHOD AND SYSTEM FOR INTER-PROCESS COMMUNICATION

RELATED APPLICATIONS

This patent application claims the benefit of priority under 35 USC §119 to U.S. Provisional Application Ser. No. 60/732,038 filed Oct. 27, 2005 and entitled MOBILITY SYSTEM; which application is hereby incorporated by reference in its entirety.

This application is also related to U.S. Utility patent application Ser. No. 11/588,849 filed 26Oct. 2006 and entitled Mobility System and Method for Messaging and Inter-Process Communication; and U.S. Utility patent application Ser. No. 11/588,878 filed 26 Oct. 2006 and entitled Information and Status and Statistics Messaging Method and System for Inter-Process Communication; each of which applications are hereby incorporated by reference.

FIELD OF THE INVENTION

This invention relates generally to systems, methods, architectures, and computer programs and computer program products for interprocess communications, and more particularly to a message structure, a procedure for generating the message structure, applications of the message structure and messaging method for obtaining status, statistics, and other information and for performing an information or parameter set operation across one or more process boundaries, and to other device and system architectures and methods for utilizing the messages and messaging methodology.

BACKGROUND

Conventionally, authoring a single or small set of executable software or other program code for what may be considered as bundling of multiple functions or operations into the single process code has had the advantage that communication between the multiple functions or operations is simplified. Communications between any two functions within the single executable program code has also been relatively simple in that communications between any two or more of the multiple functions may readily be achieved by passing or sharing memory contents or ranges within the single executable software or other program code.

Unfortunately, executing the single (or small set of) executable software or program code has had the disadvantage that it may contribute to instability because of functions that may sometimes tend to interfere with each other in unexpected ways during their execution in the real world, as well as possible susceptibility to security flaws, memory overflow, and other problems. It may also complicate the task for developers to work together without having detailed knowledge of other developers efforts.

Therefore, it has been recognized that in at least some instances, there are advantages to separating different functions or operations, even when related or when requiring coordination between the related functions, to separate the functions into different processes that have defined process boundaries and are executed independently and advantageously substantially autonomously from one another. Typically, however, since the processes are at least somewhat related or interdependent, some degree of communication between the different processes, usually referred to as Inter-Process Communications or IPC, is required to facilitate operation of the system as a whole.

Software and system designers have utilized various interprocess communications architectures and methods in the past to permit communications between different processes within in a system. Unfortunately, these architectures, methods, procedures, and interprocess communications techniques have had limitations so that they have not necessarily been universally applicable to the diverse range of system architectures, device characteristics, or functional and operational needs. They may also have had complicated interfaces that required relatively high levels of programming skills that added to the cost and time involved in implementing them and were more difficult to test and debug.

For example, some conventional interprocess communication or messaging techniques are protocol or transport layer dependent, or are client-server relationship specific in some way, or are merely remote program calls, or other situation where there is again an asymmetry, dependency, special treatment or characteristic, or bias toward one of the message sender or receiver. Furthermore, these conventional interprocess communication techniques, architectures and methods may not usually be able to efficiently and reliably provide the type of interprocess communication that are required for particular situations or applications.

One of conventional communication, that may be thought of as a pseudo interprocess communication technique was the Sun Microsystems remote program call (RPC) technique. Another was the Open Network Computing (ONC) remote program call technique. Each of these techniques involved specifying one or more interfaces to a library so that there was a client on one side of a network and a server on the other side of the network, and to the client it would essentially appear that the client was making a direct functional call to a library on the server even though was or might be a network between the client and the server based library. These RPC models may be considered to be asymmetric and very much client-server models which means at the very least that each side has either a special server characteristic, a special client characteristic, or some other side specific characteristic. These side specific characteristics are frequently undesirable in many applications.

Many of these conventional interprocess communication or pseudo interprocess communication models, methods, and techniques were also synchronous in that there was a need for the sender process to receive a response back from the intended recipient or receiver process before the sender process could continue. Since the response in many networking situations could take at least large fractions of a second, such synchronous operational requirements led to inefficiencies, unnecessary overhead, and reduced performance.

Conventional interprocess communication schemes and techniques and even the messages themselves were also frequently difficult to implement and typically required highly skilled computer programmers with an ability to program code in relatively low-level and non-intuitive languages such as the C, C++, and similar programming languages.

Conventional processes also frequently fell primarily or even exclusively into one of two models: a thread execution based model or a finite state machine based execution model.

Therefore, there remains a need for an interprocess communication method, model, and architecture in which the interprocess messaging is more symmetric and peer-to-peer or message producer-consumer like in approach without a bias as to which process, device, or system is the producer and which process, device, or system is the consumer of any particular messaging event. Even where there may actually be a server and a client, such labels from the standpoint of the messaging event are or should be relatively unimportant.

There also remains a need for a message structure that provides the desired message information and content and that is compatible with the messaging model and method.

There further remains a need for a message that is relatively easy to specify and that may advantageously be written in a relatively high-level language, such as for example in the XML language or other higher level language.

There also remains a need for a interprocess message communication methodology and message structure that permits the sharing of information across process boundaries whether the process boundaries exist between processes in a single hardware device or between separate hardware devices that are either collocated in a facility that may use one particular message transport layer, or coupled or connected over a communications link between geographically remote hardware devices or systems possibly using a different transport layer but the same message structure.

There also remains a need for an interprocess communication scheme and message structure that permits authoring and generating messages and communicating messages between different processes that is simple and efficient.

There also remains a need for an interprocess communication scheme and message structure that is suitable for wired, wireless, and hybrid wired and wireless network communication infrastructures, including infrastructures involving one or more of network servers, routers, switches, access points, and clients.

There also remains a need for an interprocess communication scheme and message structure that permits efficient operation with low overhead in both thread-based execution schemes and finite state machine based execution schemes, particularly as they may apply to different devices and systems in a network infrastructure and network packet processing environment.

There also remains a need for an interprocess communication scheme and message structure that permits the acquisition by one process of the status and statistical information known within or available from another process.

There also remains a need for an interprocess communication scheme and message structure that permits persistent and/or non-persistent setting of information or data using a message sent from a first process and received by a different process.

SUMMARY

This invention provides systems, methods, architectures, and computer programs and computer program products for inter-process communications, and more particularly to a message structure, a procedure for generating the message structure, applications of the message structure and messaging method for obtaining status, statistics, and other information and for performing an information or parameter set operation across one or more process boundaries, and to other device and system architectures and methods for utilizing the messages and messaging methodology.

In one aspect, the invention provides a method for setting an information across an interprocess boundary from a from an information producer process to an information consumer process using an information setting message, where the producer and consumer processes are separated by at least one process boundary, the method comprising: generating an information set request in the producer process; communicating a message including the information set request from the producer process to the consumer process; receiving the information request by the consumer process; and processing the request and setting the information in the consumer process.

In another aspect, the invention provides a computer readable medium encoded with a computer program for directing a computer to set an information in an information consumer process, where the consumer process is separated by at least one process boundary from an information producer process, the computer program including a module that includes executable instructions for: generating an information set request in the producer process; communicating a message including the information set request from the producer process to the consumer process; receiving the information request by the consumer process; and processing the request and setting the information in the consumer process.

In another aspect, the invention provides a system for setting an information from an information producer process to an information consumer process, where the producer and consumer processes are separated by at least one process boundary, the computer system comprising: means for generating an information set request in the producer process; means for communicating a message including the information set request from the producer process to the consumer process; means for receiving the information request by the consumer process; and means for processing the request and setting the information in the consumer process.

In another aspect, the invention provides a method for defining information to be set in an external process in a computing machine or device, the method comprising: defining a message using a high-level language; automatically generating a plurality of application programming interfaces (APIs) including implementation code and any interfaces; using the APIs to transfer information, data, or state from one process to another process across a process boundary.

In another aspect, the invention provides a method for designing an information setting message comprising: (1) defining an information setting (NPS) message in a high-level descriptive language; (2) running the high-level descriptive language through an NPS message transformation or modification tool adapted to the high-level descriptive language to generate per-NPS message Application Program Interfaces (APIs); and (3) using these APIs to set the NPS information from one process to another process.

In yet another aspect, the invention provides for implementation of at least some of the various methods to be implemented as computer programs where the computer programs may include a computer readable medium encoded with a computer program for directing a computer, or a processor, or other logic circuit or logic means to act in a particular manner.

BRIEF DESCRIPTION OF THE DRAWINGS

Embodiments of the invention are illustrated in the figures. However, the embodiments and figures are illustrative rather than limiting; they provide examples of the invention.

FIG. 8 depicts an exemplary embodiment of a STAT header for the STAT request and STAT response.

FIG. 9 depicts an exemplary embodiment of record and keys used in an embodiment of the inventive STAT message format.

FIG. 11 depicts an exemplary embodiment of a structure of an NPS request and an NPS response.

FIG. 12 depicts an exemplary embodiment of an NPS header for the NPS request and NPS response.

In the figures, similar reference numerals may denote similar components.

DETAILED DESCRIPTION OF EMBODIMENTS OF THE INVENTION

Introduction

Figure 1:
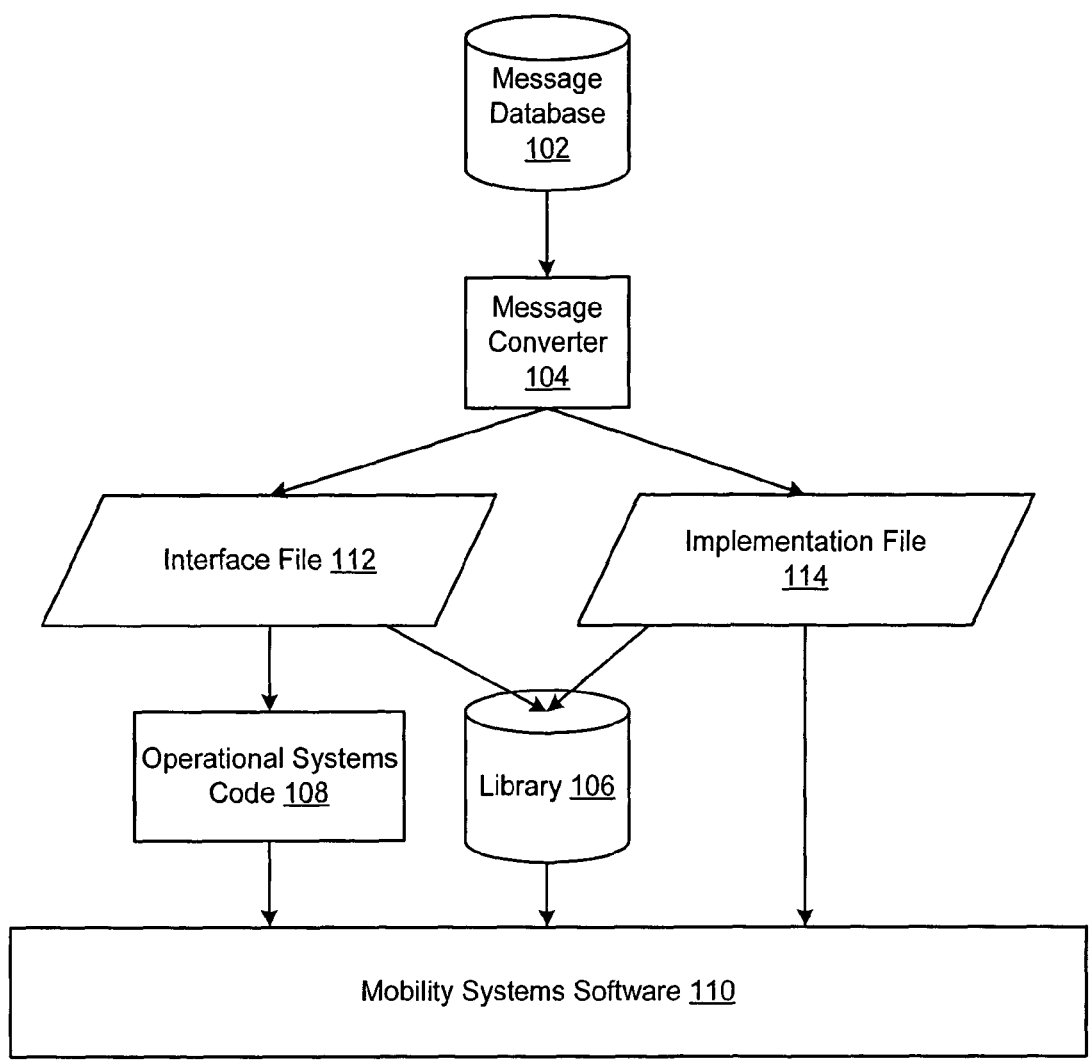
FIG. 1 depicts a diagram of components of a non-limiting exemplary mobility system.

A communication and messaging system, method, computer program and computer program product are described for communicating or messaging between two or more processes. This inter-process communication or messaging scheme may be applied between any two processes whether within a single physical device, between processes executing in different devices, in peer-to-peer situations or in client-server or server-client situations, and in any other situation where there is a need or desirability to communicate, message, send instructions, make requests, pass parameters, get status or other information, set parameters, data, or other information, or in any other way perform one-way, two-way, or multi-way information exchanges between computer programs or processes.

Aspects of the invention provide for sending general messages between processes, that may or may not result in an optional response from the receiving process. Other aspects of the invention provide for sending a message from a first process to a second process that will result in the return or retrieval of an information item or data from the second process, whether that returned information item or items be status from the second process, statistical information that the second process has access to, or any other information. In another aspect, the invention provides for sending a message from a first process for non-persistently setting (or persistently setting with an additional store or save operations) some information item, data, status, flag, condition, or any other parameter, value, or state in a second process. The non-persistently set information item can then be made persistent by having the second process persistently store, keep, save, utilize, or by any other means retain the information sent from the first process to the second process.

In general terms, elements of the general messaging system and method are also used for the system and method for returning or receiving information from a second process, and elements of both of these systems and methods are used for setting information in a second process by the first process. Extensions and enhancements are added at each level to achieve the desired operation. The generalized interprocess messaging, the interprocess information retrieval, and the interprocess information setting are described below.

Exemplary Automated Interprocess Communication Message Structure and Method

Techniques described herein enable developers to create interprocess communication messages without having to implement marshalling and unmarshalling functions or worry about many other aspects of interprocess communications, and to provide an intuitive means of specifying and using those messages. An example of a system developed according to this technique provides automated Inter-Process Communication (IPC) (such as for example, various processes in a LAN) to allow developers to work only on an XML layer; this allows messages to be specified using only XML. The messages may be organized into catalogs of specific functions. Advantageously, a developer can register a function against a message so that a single dispatch can be called to handle both. This is particularly valuable in a system that includes multiple processes with the need to communicate with each other. In a non-limiting embodiment, marshaled messages are hardware architecture agnostic and message transport is independent of the messages.

In one non-limiting embodiment, an exemplary system configuration with which the inventive messaging architecture, method, procedures, and computer program and computer program product may be utilized may include a network device, such as for example a network switch, is coupled for communication with a network management system. In one embodiment the network management system may include the Ringmaster™ server management software (manufactured by Trapeze Incorporated of Pleasanton, Calif.). The network management system may further include mobility systems software. Though not required for practicing the invention, a network management system, such as the Ringmaster™ server network management system, provides a client server application that enables organizations to perform pre- and post-deployment planning, configuration, and monitoring and management, of the network infrastructure. The two or more processes which may for example take place between two processes executing in a device, such as for example in a network wireless switch or other device or system. For example, if the device is a switch, then a first process that is involved with a web http process may need to talk to a second process involved with device configuration so that the process involved with the device configuration can enable or disable the http process for communication or to get status, statistics, or other information, or even to set some parameter or condition. These are merely non-limiting examples of interprocess communications that may benefit from the inventive features.

Aspects and features of this invention have been described in co-pending U.S. Provisional Patent Application No. 60/732,038 filed 27 Oct. 2005, entitled MOBILITY SYSTEM, including in the specification, drawings, and computer program code and pseudo-code that is included in one or more of the appendices of that application, and which application is hereby incorporated by reference in its entirety.

In a non-limiting implementation, rather than developing a new language to obtain desired functionality, XML was used to facilitate use of the system without extensive retraining of developers in the new language. Underlying processes may advantageously be handled automatically for developers, who only needed to work in an XML (or other higher language) layer. Interfaces are advantageously generated using XML (or other higher language or more intuitive code, or other declaratory computer programming language), as well. In this particular embodiment, communication between processes is accomplished by passing messages through UNIX domain sockets. However, the communication could be by any other practical means, such as over Internet sockets. Of course, the communication could be by less practical means as well, such as facsimile. Other implementations, using, for example, other languages, are anticipated and should be apparent to those of skill in the art upon a careful reading of this specification.

Various methods procedures and techniques are described in terms of two or a plurality of processes. It will be appreciated that the invention and its various embodiments include the method steps that occur between and among the different processes as well as the steps that take place in each of the processes separately as the process interacts with another process. Therefore in the embodiments described herein, although the method, technique, computer program code, or the like may be described in terms of two processes, the invention will be understood to include the steps taking place in each process separately, and vice versa.

Exemplary Embodiment of a Mobility System

FIG. 1 depicts a diagram of components of an exemplary mobility system 100. The mobility system 100 includes a message database 102, a message converter 104, a library 106, operational systems code 108, and mobility systems software (MSS) 110. In the example of FIG. 1, the message database 102 may include message catalogs. In a non-limiting embodiment, XML language is used to define the message catalogs. In alternative embodiments, other languages or scripts may be used to define the message catalogs. Each message catalog may be a file or other data structure that includes one or more messages with none, one or more message parameters as may be appropriate to the message. In a non-limiting embodiment, each message catalog file includes a single message. However, in a non-limiting embodiment, a process can include as many message catalogs (such as message catalog files) as desired or required, though the message names in such embodiments should advantageously still only occupy a single name space. For example, a message named "message_foo" should not be defined in both a message catalog named "catalog_foo" and message catalog named "catalog_bar".

Exemplary Message Specification Using XML Document Type Definition (DTD)

In one non-limiting aspect, the inventive message structure and messaging method provides an automated interprocess communication (IPC) that permits various processes to communicate with each other while the developers of the system and device architecture and computer program code do not have to work or program at any other layer than an XML (or other declaratory computer programming language) program language layer. The developers define messages using a message structure and the inventive structure, method, and programming technique handles everything else automatically to generate the information files and executable program code to implement the desired interprocess communication or messaging.

In one non-limiting embodiment, the invention provides one or more message definition files and each of these message definition files may, where each message catalog may include zero to many messages, typically one or more messages, be referred to as a message catalog. In one embodiment, there is one message catalog in one file, but the message catalogs need not be files and a file is merely one non-limiting physical manifestation of how a message catalog may be defined or implemented. Advantageously, the message definition files provide a description of the message elements are written or defined in terms of the XML programming language (or other declaratory computer programming language). Table I (below) provides an example of a message catalog that may include one or more messages.

The inventive structure and method differ from conventional structures and methods in at least the following ways. First, in at least one non-limiting embodiment it has its own message definition language and language structure from other known IPC and remote program call (RPC) interprocess communication structures and methods. Second, in at least one non-limiting embodiment, the invention utilizes XML to generate the interprocess communication interfaces. Other languages may be utilized for this generation. Third, in at least one non-limiting embodiment, marshalling code is automatically generated in a "C" language file. The marshalling code puts or encodes the desired message from the easier to program and more intuitive higher-level XML language into a defined message structure, and since it put into a well defined message structure by the marshalling code, the same message when received by an intended recipient, may readily be decoded and put into a known defined structure by unmarshalling code at the recipient or receiving end. Each C-file for other implementation file advantageously includes one or a number of computer programs. These computer programs may be considered to be functions, procedures, or routines for each message and used to implement or communicate for each message.

Exemplary embodiments provide a C-file or other implementation file that provides message marshalling, a kind of well defined structured creation of a message. Message marshalling (and message unmarshalling) are described herein elsewhere.

Registration routines for each message are created by the message translation tool such as by a message compiler. A message may be created and a function is registered that is linked with or associated with that message. Advantageously, the inventive message structure and messaging method are automated as much as possible with the goal that not only are the structures created, but it is also desirable to provide the automation so that the developer can take a function and register the function against the message so that the developer may then, when a message is received, call a single message dispatch function with the message.

In a non-limiting embodiment, the structure of the messages is advantageously well-defined. Having a message that is well-defined assists in the message automation and the marshalling and unmarshalling of the message. Table 1 depicts an exemplary structure of the message catalog using the XML language and using a Document Type Definition (DTD or dtd) structural definition of a document using XML. Table 2 illustrates an instance of a catalog defined using DTD. Other message definition forms may be used so that the invention is not limited to DTD defined messages or to the XML language.

In one non-limiting embodiment of the invention, messages are defined using a simple XML document type definition (dtd) as indicated in the XML language which is further described relative to Table I below.

The exemplary message definition in Table 1 provides a document type definition (dtd) for a message catalog. It may be noted that the lower case abbreviation "dtd" and the upper case abbreviation "DTD" for Document Type Definition are equivalent and used interchangeably in this document, though the lower case "dtd" is more typically used in the exemplary code and pseudo code. The DTD defines the proper or legal building blocks of an XML document and defines the document structure with a list of legal elements. Here in Step 101, !ELEMENT CATALOG defines the element "CATALOG" as having zero or more elements called MESSAGE. It may be appreciated in light of the description provided here that a catalog may be considered (at a high level) to be like a document, and just as a document may be comprised of a single file or data set or a plurality of files or data sets, so too may a catalog be a single file or data set or a plurality of files or data sets.

The XML attribute list declaration (ATTLIST) is used to declare XML element attributes. The ATTLIST declaration defines the element which may in general have four parts, the attribute, the name of the attribute, the type of the attribute, and the default attribute value.

In step 102, !ATTLIST CATALOG catalog name NMTOKEN #REQUIRED declares that the element CATALOG has an attribute name "catalogname" and that the attribute "catalogname" has an attribute type NMTOKEN meaning that the value must be a valid XML name, and that the attribute value must be included in the element (#REQUIRED).

In step 103, !ELEMENT MESSAGE defines the element "MESSAGE" as having one element "PARAMETER*". In step 104, !ATTLIST MESSAGE callname ID #REQUIRED declares that the element MESSAGE has an attribute name "callname" and that the attribute "callname" has an attribute type ID meaning that the value is an unique ID, and that the attribute value must be included in the element (#REQUIRED).

TABLE 1

Example of a Message Defined Using a Document Type Definition (DTD)

| | |
|---|---|
| Step 100 | <!--dtd for message "aaa" --> |
| Step 101 | <!ELEMENT CATALOG (MESSAGE*)> |
| Step 102 | <!ATTLIST CATALOG<br>    catalogname NMTOKEN #REQUIRED > |
| Step 103 | <!ELEMENT MESSAGE (PARAMETER*)> |
| Step 104 | <!ATTLIST MESSAGE<br>    callname ID #REQUIRED> |
| Step 105 | <!ELEMENT PARAMETER (SUBPARAM*)> |
| Step 106 | <!ATTLIST PARAMETER<br>    id CDATA #REQUIRED<br>    type (INT\|STR\|INTARRAY\|STRARRAY\|OPAQUE\|SEQUENCE)<br>    #REQUIRED > |
| Step 107 | <!ELEMENT SUBPARAM EMPTY> |
| Step 108 | <!ATTLIST SUBPARAM<br>    type (INT\|STR\|OPAQUE) #REQUIRED > |

In step 105, !ELEMENT PARAMETER defines the element PARAMETER as having one element "SUBPARAM".

In step 106, !ATTLIST PARAMETER id CDATA #REQUIRED type (INT|STR|INTARRAY|STRARRAY|OPAQUE|SEQUENCE) #REQUIRED, declares that the element PARAMETER has an attribute name, where CDATA indicates that the value is character data, (INT|STR|INTARRAY|STRARRAY|OPAQUE|SEQUENCE) indicates enumerated values of INT, STR, INTARRAY, STRARRAY, OPAQUE, SEQUENCE and that the value must be included in the element (#REQUIRED).

In step 107, !ELEMENT SUBPARAM EMPTY defines the element SUBPARAM as having no additional elements (e.g., is empty).

In step 108, !ATTLIST SUBPARAM type (INT|STR|OPAQUE) #REQUIRED declares that the element SUBPARM has an attribute type and no name or ID.

By way of summary, this set of steps says that catalogs may include messages, messages may include parameters, and parameters may include sub parameters.

It will be appreciated that the marshalling procedure may advantageously utilize a well defined format that does not introduce ambiguity into the marshaled code structure so that unmarshalling or extraction of the message or message catalog content may be performed in an efficient and unambiguous manner. Advantageously the marshalling and unmarshalling are performed in a manner and according to rules that permit the marshaled and unmarshalled messages (and/or compiled and/or decompiled versions thereof) to be understood in a hardware, operating system (OS), and/or applications program, interface, or computing or processing environment agnostic manner. In at least non-limiting embodiments of the invention, the particular message definition, marshaled, and/or unmarshalled message format or formats is not important so long as there are understandable rules that are used to put the message information into the form (marshal) and then later extract it (unmarshal). In one non-limiting embodiment, a marshaled message may be unmarshalled in different formats for different processes if desired or required. There is no one standard that needs to be implemented, whatever standard or implementation adopted, just needs to be repeatable. The particular embodiment of the format and rules described herein do provide some particular advantages to the particular network environment inter-process communications.

It will be appreciated in light of the description provided herein, that embodiments of the invention provide a way of describing a message as consisting of a number of parameters wherein each parameter may be described as to the data or information it represents. The inventive message structure and messaging method are able to collect one or a plurality of messages into a catalog of messages (message catalog).

Exemplary Method and Procedure for Marshalling a Message

An exemplary process for marshalling information generally and for marshalling a message in particular is now described.

Marshalling information or data refers generally to a procedure for collecting, constructing, organizing, formatting, or otherwise bringing together information or data in any form and putting it into a well defined standard form or organization. Data or information may include but is not limited to numbers, symbols, characters, code, messages or message components, statistics, status, indicators, binary or ASCII representations, or any other data or information without limitation. A particular marshalling procedure that is applied to a non-limiting embodiment of the invention that optionally but advantageously uses a network operating system (NOS) context, to generate the messaging code and provide the message generation, transmission, and message receipt infrastructure. This messaging methodology may be applied to messaging amongst and between a plurality of processes in a network environment that need to, or are advantaged by, communication with each other either directly or indirectly.

The structures of the messages are advantageously defined or well defined and based on rules or policies that provide not only for the construction or marshalling of the message or messages but also provide for the unmarshalling or extraction of the message content or information in a different receiving process that is advantageously but optionally any one or a combination of operating system agnostic or independent (or does not care), hardware, software, language, environment and/or in other ways agnostic or independent, so that the structures of the messages, and the marshalling and unmarshalling will work properly and predictably in any environment, and in particular will work where the sending computing or messaging environment is different from the receiving computing or messaging environment.

In one non-limiting embodiment, the interprocess communication in the form of messaging uses UNIX domain sockets to pass messages. In another non-limiting embodiment, the interprocess communication messaging uses Internet sockets to pass messages. In yet another non-limiting embodiment, the interprocess communication messaging uses a shared memory, a file or files, or any other means to pass messages.

In one embodiment of the invention, a simple and relatively high-level programming language (such as XML) is used to define messages and message catalogs, and a message converter tool (optionally including a message marshalling tool) is then used to convert the messages and message catalogs into marshaled computer code. Advantageously the converted or marshaled computer code may be in a derivative or different computer language, such as in a language that is more closely adapted to the computing or information processing environment that will execute or otherwise use the marshaled computer code. In one non-limiting embodiment, the different or derivative language may be the C, C++, or other language without limitation. For example, though having some possible disadvantages, even programming languages such as Fortran, Cobol, Pascal, new languages yet to be developed as well as enhancements and extensions to known languages may be used.

Because the rules and structure of the converted or marshaled message computer code are well defined, a different or complementary second conversion or unmarshalling tool may advantageously be used to unmarshall the message (or perform a second conversion) so that the receiver of the message may readily understand and/or extract the content of the received message even though the receiver process may exist in a different hardware, operating system, application program, or other environment.

In the exemplary embodiments described herein, the marshalling and subsequent unmarshalling of messages and/or message catalogs generate one or more message catalogs based on specifications or definitions in the XML language, such as XML version 1.0 however, the invention is not limited to any particular XML or other language version. In particular it will be appreciated that later versions of XML may be utilized in conjunction with the invention as well as later languages that may be used in the computer and programming arts, particularly as they apply to network devices and systems. In other non-limiting embodiments of the invention, the marshalling and subsequent unmarshalling of messages and/or message catalogs generate message catalogs based on specifications or definitions in some other language, which other language is advantageously higher-level and therefore a simpler, easier to program, and/or more intuitive (language). The marshalling language and unmarshalling language may the same or may be different languages. The unmarshalling may result in the initial message form or may result in a different message form or structure so that the marshalling and unmarshalling need not be symmetrical.

A message transformation tool, such as a message compiler, automatically creates the marshalling and unmarshalling tools so that a computer code or program developer may work in the relatively high-level or more intuitive programming language (such as XML) and does not need to know how to explicitly and in detail create either the marshaled code (or unmarshalled code) or the converted or compiled version of the marshaled or unmarshalled code (such as for example the header file and the C-file code described herein elsewhere).

In one non-limiting embodiment, a first file, referred to as an interface or header file, describes the contents of a second file (such as the C-file), and the second or implementation file (such as the C-file) implements the marshalling of the message and the transport of the message to the other process. However, it will be appreciated that the invention itself is transport independent and that any transport process or mechanism may be used.

Exemplary Processes, Messages, and Message Catalogs

In at least one non-limiting embodiment of the invention, multiple or a plurality of message catalogs may be related. By way of example, but not limitation, a first process ("Process A") may support message catalogs 1, 2, and 3; and a second process (e.g., "Process B") may support message catalogs 1, 5, and 6. Each message catalog may therefore support either non-overlapping (e.g., disjoint) processes, partially overlapping or common processes, or completely overlapping processes, without limitation. These are some examples of relationships between message catalogs.

A message catalog is defined by a message catalog definition. In one non-limiting embodiment the message catalog definition has a form exemplified by the XML message catalog definition shown in Table 2.

TABLE 2

| Exemplary Message Catalog Definition | |
|---|---|
| Step 110 | <?xml version="1.0" ?> |
| Step 111 | <!DOCTYPE CATALOG PUBLIC "-//TRPZ/DTD Messages definition 1.0//EN" "messages.dtd"> |
| Step 112 | <CATALOG catalogname="testcatalog"> |
| Step 113 | <MESSAGE callname="testone"> |
| Step 114 | <PARAMETER id="1" type="INT"/> |
| Step 115 | <PARAMETER id="2" type="STR"/> |
| Step 116 | <PARAMETER id="3" type="INT"/> |
| Step 117 | </MESSAGE> |
| Step 118 | </CATALOG> |

In this exemplary message catalog definition, Step 110, identifies the XML version as being version="1.0". This statement, the XML declaration should always be included as the first line in the document, and defines the XML version of the document. In this case the document conforms to the 1.0 specification of XML.

In Step 111, a document type declaration (!DOCTYPE) is used to wrap the included DTD in the XML source file and says the only valid document type here is a CATALOG and having a catalog name. For purposes of this example the catalog name is testcatalog but it can be any name. Here, the root element CATALOG PUBLIC is the "-//TRPZ/DTD Messages definition 1.0//EN messaged document type definition "messages.dtd" (See also Table 1)

Next (Step 112), the <CATALOG catalogname="testcatalog"> refers back to the description in Table 1 (Steps 101 and 102) for the catalog with catalog name testcatalog.

Then (Step 113), <MESSAGE callname="testone">, specifies three parameters for the message testone: a first parameter having id=1 and type integer (<PARAMETER id="1" type="INT"/>), a second parameter having id=2 and having type string (<PARAMETER id="2" type="STR"/>), and a third parameter having id=3 and a type integer (<PARAMETER id="3" type="INT"/>), and ends with </MESSAGE> </CATALOG>.

This message catalog is then processed through the message transformation tool or message converter 104, such as for example through a message compiler, to generate an implementation file or data structure (such as for example a C-language file or data structure) and an interface file or data structure (such as for example a C-language header file). Typically the language of the implementation file and of the interface file will be the same, but they need not be, and in some embodiments there will only be an implementation file without an interface or header file. In these situations, the interface information may usually be provided within the implementation file itself, or by other means. It will be appreciated in light of the description provided herein, that the inventive system and method may be implemented in a variety of languages, and even for example when the implementation file is a C-language file, the invention includes all of the versions, variation, enhancements and extensions to the C-language, such as for example but without limitation to the C, C++, Java, Fortran, Pascal, Cobol, and any other language.

It will be noted that the term file may refer to a file or any other data structure whether in the form of a traditional file or other data structure. In one non-limiting embodiment, the message and message catalog are written or defined in the XML language and the compiler is an XML compiler that generates a compiled output into the target output program language, such as the C-language.

Exemplary Message Transformation Tools, Converters and Compilers

In the example of FIG. 1, the message transformation tool or message converter 104 (such as for example a message compiler) transforms or converts each message into an interface file 112 (where required) and an implementation file 114. In a non-limiting embodiment, the message converter may be a message compiler that compiles or transforms the code into the two files. By way of example but not limitation, the interface file 112 may be a C-language header file and the implementation file 114 may be a C-program language file. In an alternative embodiment, the message converter 104 may be an interpreter and, by way of example but not limitation, the resulting code could be included in a single (e.g., Java) file rather than in both an interface file 112 and an implementation file 114.

Table 3 and Table 4 depict examples of a header file (a type of interface descriptor file) and a C-language executable file (a kind of message implementation file), respectively, that might be generated according to one alternative embodiment.

An exemplary compiler output of the C-language implementation file and the C-language language header file are illustrated in Table 5 and Table 6. FIG. 1 also illustrates relationships between the interface file the implementation file and other elements of the system.

With reference to Table 3, in one non-limiting embodiment, the catalog interface procedure comprises the steps of: creating a function to handle each response (Step 121), registering the function in the message catalog (Step 122), calling or otherwise utilizing the marshal code to create a message (Step 123), sending the encoded message to a message recipient (such as to a server or to a different recipient directly or indirectly through a server) (Step 124), receiving and reading a response from the recipient or server (either directly or as an intermediary from a different ultimate recipient and responder) (Step 125), and calling the generic or overall unmarshalling routine (e.g., unmarshall_testcatalog) to process the incoming message (Step 126). The unmarshalling call may optionally include an argument (such as a last argument in an argument list) to be passed to the function defined in step 121 and may be used to maintain state. In the exemplary code in Table 3, the last argument "NULL" is used for this state maintaining purpose.

In the step of sending the encoded message (Step 124) above, the transport layer used is not important, it can be a file, or any other transport mechanism or layer.

Although XML program language is preferred and described herein, it may be appreciated that other programming languages may be used instead or in combination. For example, the invention may be implemented using any formal computer program language that allows one to define a structure, usually any declarative language.

In one embodiment, two files are utilized. Advantageously, one file provides a header (or interface description for the second file) and the second file provides the implementation details. The header file is referred to as an interface file because it describes the interface(s) that is or are available for passing messages.

The header or interface file is provided to other programs to use and identifies what is in the second implementation or C-file. The term C-file is used because in one preferred embodiment, the implementation file is a C-language program code file. The implementation or C-file may be a single file or may be separated into a plurality of files. For example, though no particular advantage may be provided, the second or C-file may be cut or separated into a plurality of files, such as for example into as many separate files as there are C-functions. Since the file is automatically generated, it does not matter how large the implementation or C-file is. In the context of embodiments of the invention, there is no need or particular advantage to separate the contents of the implementation or C-file. Furthermore, though not required, anyone process or device using one component of the implementation or C-file probably wants to or readily may use all or selected ones of the components of the single implementation or C-file, so that there is probably no advantage to using more than a single header file.

For ease of description, it will be understood that the use of the term C-file implies any implementation file having the properties described herein, and not merely to a C-language program file. In similar manner, reference to a header or h-file refers to any interface file having the properties described herein.

In one non-limiting embodiment, one implementation or C-file and one interface or header-file are provide per message catalog. This may typically be true when each message catalog includes a single message. That is, compilation of each XML file ultimately generates one C-file and one header-file. Alternatively, one may put more than one XML file into a catalog, so that the multiple-XML containing catalog may be compiled into a one C-file and one header file. The use of multiple files may typically be advantageous when the catalog is particularly large; however, in prototype implementations, no practical limits for single file implementations have been identified.

In general, a catalog can have an unlimited number of messages, and therefore an unlimited number of XML message descriptions. However, as one of the objects of the present invention is to provide an easier code development procedure where a code developer need only concern her-self/him-self with the single coding or programming task at hand, it is advantageous to have each XML file compile into one C-file and one corresponding h- or header-file.

The invention is not however limited to implementation languages that require or are compatible with header files. For example, some languages, such as PERL, may be used for the implementation file and yet do not require or even benefit from a header file. It is a dynamic or interpretive language and does not need a header file. Even for a C-language (or any other language) implementation, the invention may be implemented without an interface or header file so long as one specifies the appropriate rules and policies for interpretation of the implementation file. Alternatively or in addition, the information that would have been placed in the header or interface file may be included in the implementation file itself so that when that implementation file is accessed or opened, the information will be available to interpret and use the implementation file. In one non-limiting embodiment that utilizes XML program language for the operations for a client program use of the message catalog and interface, the code or pseudo code shown in Table 3 serves as an example.

TABLE 3

Exemplary Program Pseudo Code for Client Program Use of the Catalog Interface

| 121 | Create a function to handle each response | static int<br>testonefunc(int p1, char * p2, int p3, void * arg)<br>{<br>   fprintf(stdout, "Called with %d, %s, %d\n", p1, p2, p3);<br>   return 1;<br>} |
|---|---|---|
| 122 | Register the function in the catalog | register_mfunc_testcatalog("testone", testonefunc); |
| 123 | Call the marshall code to create an encoded message | marshall_message_testone(buffer, 2048, 55, "test", 28); |
| 124 | Send the encoded message to the server | Send message (transport independent) |
| 125 | Read a response from the server | Read message (transport independent) |
| 126 | Call the unmarshall routine to process the incoming message | unmarshall_testcatalog(buffer, 2048, NULL); |

Exemplary Function Prototypes

Function prototypes are advantageous when trying to compile or code against. Table 4 sets forth exemplary rules or policies for creating function prototypes. The prototypes are included in the header files.

The following rules in Table 4 may be used in one embodiment to create function prototypes. An exemplary sample header file, such as may be generated by compiling the message catalog illustrated in Table 5, and an exemplary implementation file (here an implementation file in the C-language) illustrated in Table 6.

TABLE 4

Exemplary Rule Set for Creating a Function Prototype for the Interface File

| Rule 1 | marshall_message_%s using the message name |
| Rule 2 | unmarshall_message_%s using the message name |
| Rule 3 | unmarshall_%s using the catalog name |
| Rule 4 | register_mfunc_%s using the catalog name |

The rules set forth a procedure or logic within the message transformation tool or message compiler 104 for generating information for the interface or header file or other data structure. These rules are described by way of an exemplary transformation between definitions in Table 2 as inputs and resulting code in Table 5. Two of the rules in Table 4 apply to messages (Rule 1 and Rule 2) and two of the rules apply to catalogs (Rule 3 and Rule 4) one each for marshalling and unmarshalling. In the case of marshalling the message catalog, the result is called register message function (e.g., register_mfunc_testcatalog) rather than marshall_testcatalog.

Rule 1 applies to marshalling and specifies that the message should be marshaled or constructed using the message name. Step 206 of Table 5 is an example of the result of applying Rule 1 from Table 4 to generate the particular message component "testone" of the header file. Table 4 is inside of the message compiler—logic inside of the message compiler, and for every message inside the message catalog, these rules get applied, and that application yields or generates the output in the interface or header file of Table 5.

Applying the first two rules to message named "testone" results in marshall_message_testone (see step 206 in Table 5) and unmarshall_message_testone (see step 212 in Table 5), and applying the second two rules to the catalog named "testcatalog" which results in register_mfunc_testcatalog (see step 205 in Table 5) and unmarshall_testcatalog (see step 218 in Table 5). More particularly, Step 206 of Table 5 (e.g., marshall_message_testone) is the result of applying Rule 1 to Step 113 of Table 2 (e.g., <MESSAGE callname="testone">); Step 212 of Table 5 is the result of applying Rule 2 of Table 4 to Step 113 of Table 2; Step 218 of Table 5 is the result of applying Rule 3 of Table 4 to Step 113 of Table 2; and Step 205 of Table 5 is the result of applying Rule 4 of Table 4 to Step 112 of Table 2. It may be appreciated that other or alternative rules, or transformation tool, or compiler logic may be used to implement the desired message transformation, conversion, or compilation, and that the rule execution embodied in the examples are for purposes of illustration and not a limitation of the invention.

TABLE 5

Exemplary Sample Automatically Generated Interface or Header File or Data Structure

| | |
|---|---|
| | /* |
| Step 201 | * testmessages.h - automatically generated file. |
| | */ |
| Step 202 | #ifndef TESTMESSAGES_HDR |
| Step 203 | #define TESTMESSAGES_HDR |
| Step 204 | typedef int (*intfunc)( ); |
| Step 205 | extern int register_mfunc_testcatalog(char * name, intfunc func); |
| Step 206 | extern int marshall_message_testone (<br>    char * buffer,<br>    int bufsize,<br>    int parameter_1,<br>    char * parameter_2,<br>    int parameter_3); |
| Step 212 | extern int unmarshall_message_testone (<br>    char * buffer,<br>    int bufsize, |

TABLE 5-continued

Exemplary Sample Automatically Generated Interface or Header File or Data Structure

|  | int * parameter_1,<br>char ** parameter_2,<br>int * parameter_3); |
|---|---|
| Step 218 | extern int unmarshall_testcatalog(char * buf, int size, void * arg); |
| Step 219 | #endif /* TESTMESSAGES_HDR */ |

It will be apparent by comparing the content of the XML-based message definition file in Table 2, and the automatically created interface file (e.g., h-file or header file), and implementation (e.g., content-file or C-file) that there are related or associated entries in each file. Advantageously, a developer creates a message catalog and then includes the header file, and this becomes part of the library. The developer generates the definition and understands the rules which are very clear as to how the function prototypes are structured and generated, a developer may then generate code and the code may use or reference the function prototypes, and need not know or care at all about how the messaging happens.

Recall that the program code developer merely needs to define the message "testone" as belonging to the message catalog "testcatalog" and having parameters 1, 2, and 3 with parameter types integer (INT), string (STR), and integer (INT) respectively (See Table 2). The inventive structure and method then automatically and without programmer intervention through the compiler or other message transformation tool generates the interface (e.g., the h- or header file) and the implementation (e.g., C-file). Exemplary interface file and implementation files are illustrated in Table 5 and Table 6 respectively.

It will be apparent from the description provide herein that the program developers task is vastly simplified by being able to define the message in an XML file (or other high-level definition format) and have the inventive method generate the interface and implementation files. Once these interface and implementation files have been generated, a program (such as a client program) may utilize the catalog interface to send a message and receive and handle a response.

TABLE 6

Exemplary Sample Implementation File or Data Structure (Here a Sample C-File)

|  | /*<br>* testmessages.c - automatically generated file.<br>*/ |
|---|---|
| Step 302 | |
| Step 303 | #include "util/message.h" |
| Step 304 | #include "testmessages.h" |
| Step 305 | int |
| Step 306 | marshall_message_testone (<br>  char * buffer,<br>  int bufsize,<br>  int parameter_1,<br>  char * parameter_2,<br>  int parameter_3) |
| Step 307 | int result = 0; |
| Step 308 | void * message = create_message("testone"); |
| Step 309 | add_message_arg(message,<br>  create_message_arg(1, Int_arg_e,(void*)<br>  parameter_1)); |
| Step 310 | add_message_arg(message,<br>  create_message_arg(2, Str_arg_e,(void*)<br>  parameter_2)); |
| Step 311 | add_message_arg(message,<br>  create_message_arg(3, Int_arg_e,(void*)<br>  parameter_3)); |

TABLE 6-continued

Exemplary Sample Implementation File or Data Structure (Here a Sample C-File)

| Step 312 | result = encode_message(message, buffer, bufsize); |
|---|---|
| Step 313 | delete_message(message); |
| Step 314 | return result;<br>} |
| Step 315 | Int |
| Step 316 | unmarshall_message_testone (<br>  char * buffer,<br>  int bufsize,<br>  int * parameter_1,<br>  char ** parameter_2,<br>  int * parameter_3)<br>{ |
| Step 317 | int result = 0; |
| Step 318 | void * message = decode_message(buffer, bufsize); |
| Step 319 | unsigned int value; |
| Step 320 | *parameter_1 = get_message_arg_int(message, 1, 0); |
| Step 321 | *parameter_2 = get_message_arg_str(message, 2, 0); |
| Step 322 | *parameter_3 = get_message_arg_int(message, 3, 0); |
| Step 323 | delete_message(message); |
| Step 324 | return result; |
| Step 325 | } |
| Step 326 | #ifndef NULL |
| Step 327 | #define NULL 0 |
| Step 328 | #endif |
| Step 329 | |
| Step 330 | typedef struct _fmap_s {<br>  char * mname;<br>  intfunc mfunc;<br>} _fmap_t; |
| Step 331 | static _fmap_t SG_fmap[2] = { |
| Step 332 | {"testone", NULL}, |
| Step 333 | {NULL, NULL} |
| Step 334 | }; |
| Step 335 | Int |
| Step 336 | register_mfunc_testcatalog (char * name, intfunc func)<br>{ |
| Step 337 | int idx = 0; |
| Step 338 | for (; SG_fmap[idx].mname != NULL; idx++) {<br>  if (strcmp(SG_fmap[idx].mname, name) == 0) {<br>    SG_fmap[idx].mfunc = func;<br>    return 1;<br>  }<br>}<br>return 0;<br>} |
| Step 339 | static intfunc _lookup_mfunc (char * name) |
| Step 340 | { |
| Step 341 | int idx = 0; |
| Step 342 | for (; SG_fmap[idx].mname != NULL; idx++) {<br>  if (strcmp(SG_fmap[idx].mname, name) == 0) {<br>    return SG_fmap[idx].mfunc;<br>  }<br>} |
| Step 343 | return NULL;<br>} |
| Step 344 | Int |
| Step 345 | unmarshall_testcatalog (char * buf, int size, void * arg)<br>{ |
| Step 346 | int result = 0; |
| Step 347 | void * msg = decode_message(buf, size); |
| Step 348 | char * mname = get_message_type(msg); |
| Step 349 | int idx; |
| Step 350 | for (idx = 0; idx < 1; idx++) {<br>  if (strcmp(mname, "testone") == 0) {<br>    int p1 = get_message_arg_int(msg, 1, 0);<br>    char * p2 = get_message_arg_str(msg, 2, 0);<br>    int p3 = get_message_arg_int(msg, 3, 0);<br>    intfunc func = _lookup_mfunc(mname);<br>    result = (func)(p1,p2,p3,arg);<br>    break;<br>  }<br>} |
| Step 351 | delete_message(msg); |
| Step 352 | return result;<br>} |

Returning now to the mobility system example of FIG. 1, it will be apparent that the interface file 112 and the implementation file 114 are stored in the library 106. After storage, the library 106 includes message-specific routines. The routines may include, by way of example but not limitation, message marshalling, message unmarshalling, and registration routines for each message. In a non-limiting embodiment, these routines are not shared among messages. However, in alternative embodiments, some of the functions or routines could be shared. For example, the routines could include a dispatch routine that is shared among more than one message.

In the example of FIG. 1, the interface file 112 is included, either directly or indirectly, in the operational systems code 108. Operational systems code 108 may for example be a computer program in one of the processes making use of the library. The compiled interface file 112 and implementation files are included in the MSS 110, along with the operational systems code 108. The MSS 110 may be based upon, by way of example but not limitation, Trapeze Networks' Mobility Switch Software™.

Embodiment of Method for Utilizing a Mobility System

Figure 2:
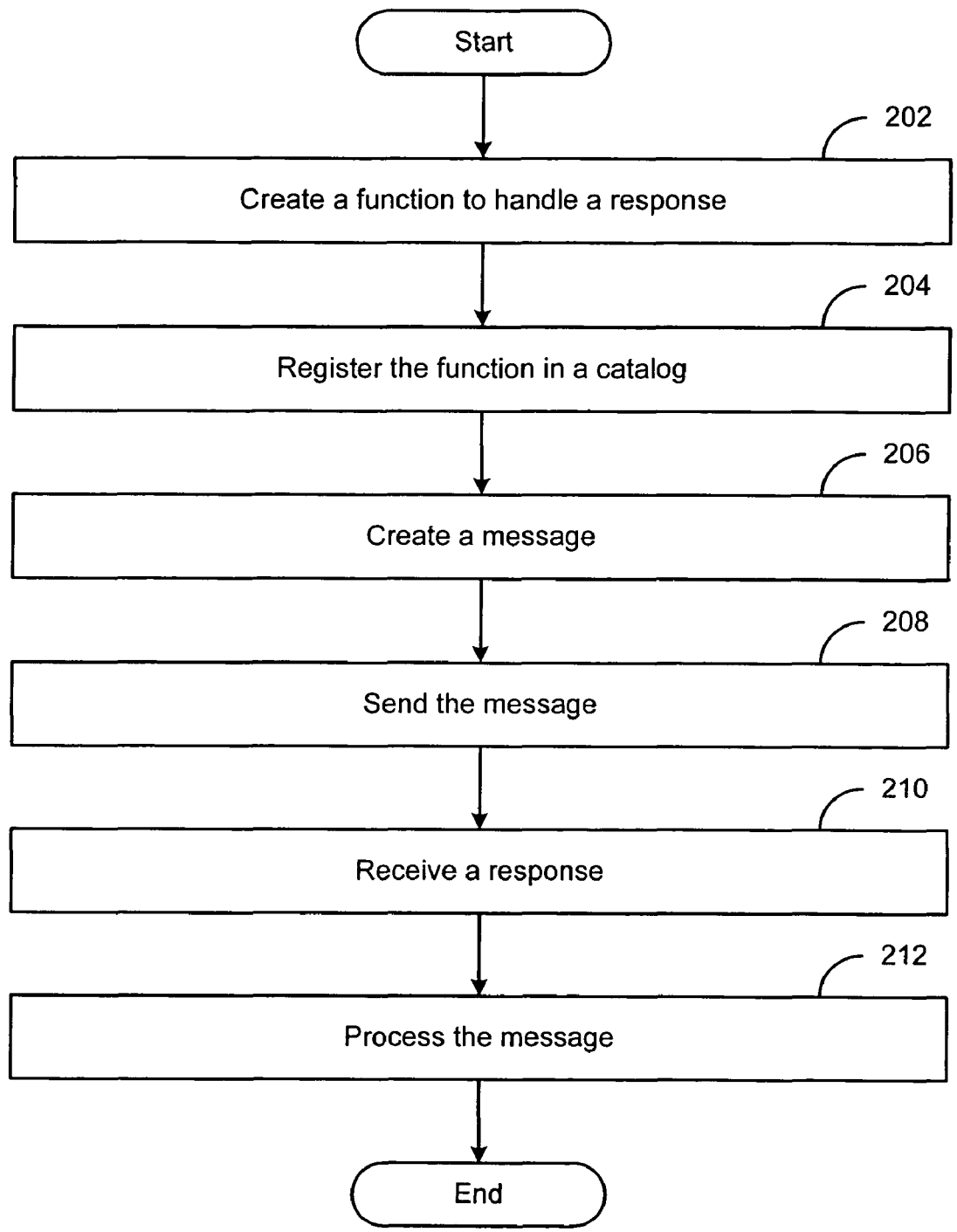
FIG. 2 depicts a flowchart 200 of an exemplary embodiment of a method for utilizing a mobility system.

Attention is now directed to a description of an embodiment of a method for utilizing a mobility system relative to the flowchart diagram of FIG. 2 depicts a flowchart 200 of an exemplary embodiment of a method for utilizing a system having interprocess communications, such as mobility system. In the example of FIG. 2, the flowchart 200 starts at module 202 where a function to handle a response is created.

By way of example but not limitation, the function to handle a response could be similar to the sample function depicted in Table 7. This exemplary function to handle a response performs a minimal function handling task.

In the example of FIG. 2, the flowchart 200 continues at module 204 where the function is registered in a catalog. By way of example but not limitation, the function may be registered with a call to registration code: "register_mfunc_testcatalog("testone", testonefunc);". See, e.g., the code "register_mfunc_testcatalog (char * name, intfunc func)" in Table 4 where in this example, char*name is "testone" and intfunc func is "testonefunc". The registration code may include registering a callback function.

TABLE 7

Exemplary Sample Handler Function

```
static int
testonefunc(int p1, char * p2, int p3, void * arg)
{
    fprintf(stdout, "Called with %d, %s, %d\n", p1, p2, p3);
    return 1;
}
```

In the example of FIG. 2, the flowchart 200 continues at module 206 where a message is generated or created. By way of example but not limitation, the message may be generated or created with a call to marshalling code to create the message: "marshall_message_testone(buffer, 2048, 55, "test", 28);". See for example, the C code for "marshall_message_testone (char * buffer, int bufsize, int parameter_1, char * parameter_2, int parameter_3)" in Table 4. Where the function may be registered at a first location or process, such as a first process (e.g., Process A), the message may be created at a second location or process, such as a at a second process (e.g., Process B). The marshalling code may include creating a message, encoding the message, deleting the message, and returning a result. Advantageously, the marshalling code does not require symmetry between the one process and another process.

When these inter-process communication or interaction aspects of the invention are applied in a network environment where there may be one of more servers or clients, these different processes may apply to server-server communications, client-server communications, and/or to client-client communications. It will also be appreciated that since the inventive system, method, and techniques do not really have a client-server, server-client, client-client, or server-server specificity, that the label of client and server are somewhat misapplied. However, it may be appreciated that the invention may be applied to clients, server, and to interactions between clients and servers. The term producer and consumer may be more appropriate and it will be appreciated that a process may at the same time be both a producer for one interaction or communication and a consumer for a different interaction or communication.

In the example of FIG. 2, the flowchart 200 continues at module 208 where the encoded message is sent. In one non-limiting embodiment, the encoded message is sent from the first process to a second process, and then a response from the second process is received and read by the first process. When making an analogy to threads, sending the message may be considered part of the same thread as the marshalling (step 206). In either case, in a non-limiting embodiment the thread does not continue, waiting for a reply from a server. Rather, the message is sent and the thread ends. In a non-limiting embodiment, the message is received at, for example, the server where the message was registered (step or module 204). The server may execute a dispatch routine, possibly including marshalling a response, and send the response back to the client.

Figure 3:
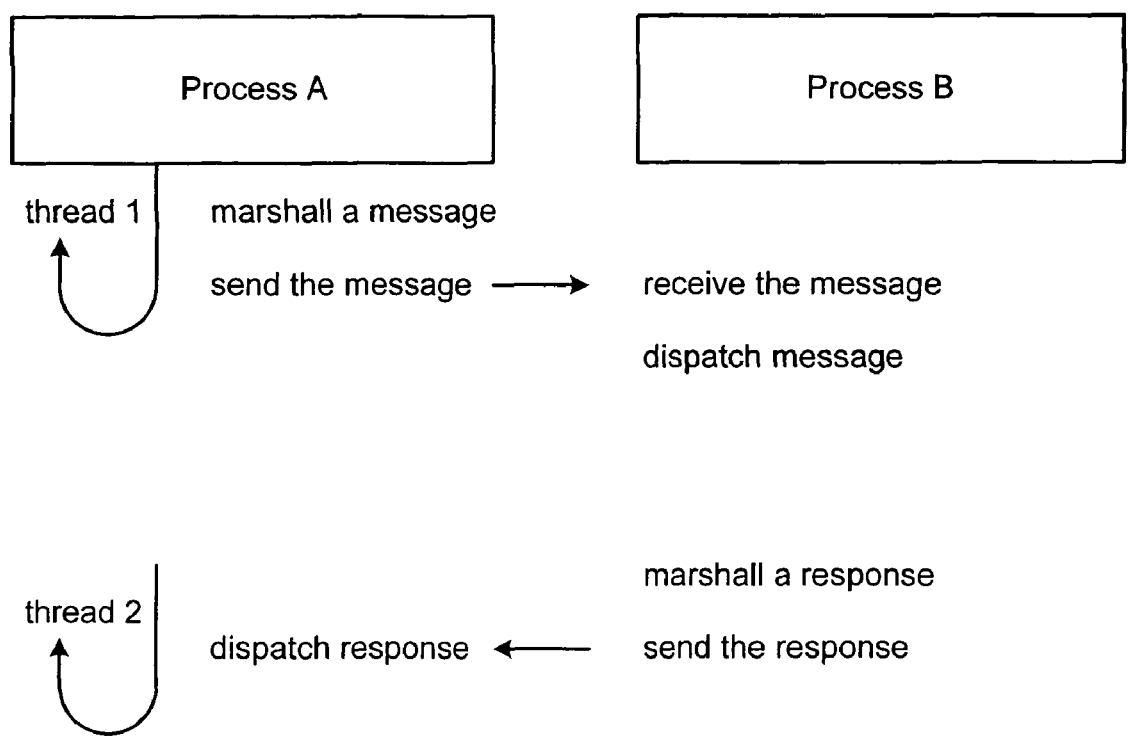
FIG. 3 depicts a flowchart 300 of an alternative exemplary embodiment of a method for utilizing a mobility system.

In the example of FIG. 2, the flowchart 200 continues at module 210 where a response is received. In a non-limiting embodiment, the response is received at the first process. The first process may start a new thread. FIG. 3 illustrates one example of the processes and threads as described in the example of FIG. 2.

In the example of FIG. 2, the flowchart 200 ends at module 212 where the incoming message sent by the one process and received by the other process is processed by for example a dispatch function. By way of example, but not limitation, the message may be processed with a call to an unmarshalling routine, such as by a call to unmarshalling code: "unmarshall_testcatalog(buffer, 2048, NULL);". See for example, the exemplary C-language code for "unmarshall_testcatalog (char * buf, int size, void * arg)" in Table 4. Processing the received response is performed in order to perform useful work with the message, such as to perform the instruction or satisfy a request made in the message. The last argument or information of the unmarshalling code (i.e., NULL) is, in the exemplary implementation, an optional state argument or information that may be passed to the function defined in Table 5, and can be used to maintain state in one of the processes or to obtain or exchange state or status information between processes.

The method of the flowchart 200 and other methods are depicted as serially arranged modules. However, modules of the methods may be reordered, or arranged for parallel execution as appropriate.

In light of the description provided herein it will be apparent that the invention provides a generalized inter-process message structure, messaging method and procedure, and substantially automated method for generating messages from high-level languages that unburden developers.

Having described various embodiments of the inventive system, method, device, and computer program for generalized messaging attention is now directed to a highlighting of several non-limiting embodiments of the invention having particular combinations of features. Some of these features may then be extended to provide information gathering capabilities and information setting capabilities across process boundaries as are described elsewhere herein.

In one (1) embodiment, the invention provides a method for automatically generating an implementation data structure for an inter-process message to achieve a communication between a first process and a second process, the method comprising: adopting a message input specification for specifying a message input language and a message input format; adopting at least one rule for converting any input message complying with the message input specification into at least one executable message structure in a message implementation language different from the message input language; receiving a particular input message complying with the message input specification; and automatically generating a particular executable message implementation data structure corresponding to the particular input message from the particular input specification.

In another embodiment (2), the method of (1) provides that the automatically generating includes processing the received input message through a message converter to generate the executable message implementation data structure.

In another embodiment (3), the method of (1) provides that the message converter comprises a message compiler and the executable message implementation data structure comprises a executable implementation file and an interface file.

In another embodiment (4), the method of (1) provides that the input message includes XML language elements, the message compiler comprises an XML-language to C-language compiler, and the executable implementation language file comprises a C-language file.

In another embodiment (5), the method of (1) provides that the message input language comprises a high-level programming language file and the implementation data structure includes a low-level executable program code file; and the low-level executable program code file is generated from the high-level programming language specification of the message without programmer coding.

In another embodiment (6), the method of (1) provides that the message input language comprises an XML programming language and the input message is defined in a document type definition file.

In another embodiment (7), the method of (1) provides that the implementation data structure comprises at least one executable program code file.

In another embodiment (8), the method of (1) provides that the executable program code comprises executable program code in a C-programming language.

In another embodiment (9), the method of (1) provides that the executable program code comprises executable program code in a C-programming language and includes a plurality of C-language program components selected from the set of program components consisting of functions, routines, subroutines, procedures, libraries, and combinations thereof.

In another embodiment (10), the method of (1) provides that n the implementation data structure further comprises an interface data structure.

In another embodiment (11), the method of (1) provides that the interface data structure comprises a header file.

In another embodiment (12), the method of (1) provides that the adopting a message input specification for specifying a message input language and a message input format, further comprises: defining the message input specification for specifying a message input language and a message input format.

In another embodiment (13), the method of (1) provides that the adopting at least one rule for converting any input message complying with the message input specification into at least one executable message structure in a message implementation language different from the message input language, further comprises: defining the at least one rule for converting any input message complying with the message input specification into at least one executable message structure in a message implementation language different from the message input language.

In another embodiment (14), the method of (1) provides that the method further comprising preparing the particular input message complying with the message input specification; and the automatically generating a particular executable message implementation data structure is performed without human intervention.

In another embodiment (15), the method of (1) provides that the high-level message specification and rules completely enable automated generation of an executable message and any interface that may be required.

In another embodiment (16), the method of (1) provides that at least one rule for converting any input message includes at least one rule for marshalling message elements into a complete message.

In another embodiment (17), the method of (1) provides that the marshalled message is hardware agnostic.

In another embodiment (18), the method of (1) provides that at least one rule for converting any input message includes at least one rule for generating a message catalog.

In another embodiment (19), the method of (18) provides that a message catalog contains messages, messages contain parameters, parameters may optionally include sub-parameters, parameters have a parameter identifier (ID), and each parameter has a parameter type selected from among a set of defined parameter types.

In another embodiment (20), the method of (1) provides that the message input specification for specifying a message input language and a message input format comprises a formal specification that defines how to specify the message in terms of a high-level XML language so that executable code to implement the specified message may automatically be generated without human coding or intervention.

In another embodiment (21), the method of (1) provides that the message is an interprocess message.

In another embodiment (22), the invention provides a computer readable medium encoded with a computer program for directing a computer to generate a particular executable message implementation data structure corresponding to the particular input message from a particular input message, the computer program including a module that includes executable instructions for: accessing at least one rule for converting an input message complying with a known message input specification into at least one executable message structure in a message implementation language different from the message input language; receiving a particular input message complying with the message input specification; and automatically generating a particular executable message implementation data structure corresponding to the particular input message from the particular input specification.

In another embodiment (23), the invention provides an inter-process message definition structure comprising: a formal message input specification wherein an interprocess message is defined in terms of a document type definition (DTD) file; at least one message catalog element including a catalog name; at least one parameter for at least one message catalog element; and an optional sub parameter for at least one parameter.

In another embodiment (24), the invention provides an inter-process message catalog data structure comprising: an XML version element; a message catalog name element; a message catalog call name element; and at least one message parameter identifier element and at least one message parameter type element.

In another embodiment (25), the invention provides a method for communicating a message between a first process and a second process, the method comprising: generating (marshalling) an encoded inter-process message data set, the inter-process message data set including an encoded message interface file and an encoded message implementation file; sending the encoded message from the sending first process to the destination second process, the sending first process not being required to wait for a response from the destination second process; receiving a response from the destination; processing the received response; and optionally extracting a state information.

In another embodiment (26), the method of (25) provides that the generation of the message includes marshalling of message elements into a message to be sent.

In another embodiment (27), the method of (25) provides that the processing of the received response includes unmarshalling the received response.

In another embodiment (28), the method of (25) provides that there is no client-server dependency relationship between the first process and the second process or between the second process and the first process.

In another embodiment (29), the method of (25) provides that the messaging between the first process and the second process is a peer-to-peer symmetric messaging.

In another embodiment (30), the method of (25) provides that the message may be sent from the first process to the second process and/or from the second process to the first process and is not a remote procedure call.

In another embodiment (31), the method of (25) provides that there is no dependency on the processing behavior or timing on either the sending first process side or the receiving destination second process side.

In another embodiment (32), the method of (25) provides that the message does not have a dependency on a processing behavior on either the sending first process side or on the destination receiving second process side.

In another embodiment (33), the method of (1) provides that for each message sent by a sender process, a response back to the sender process from the destination receiving process is optional and non-receipt of a response does not degrade operation in the first sending process.

In another embodiment (34), the method of (1) provides that in messaging, a message is sent, a acknowledgement of delivery may be returned, and a response may or may not be returned.

In another embodiment (35), the invention provides a method for sending an interprocess communication from a sending process to an external second process, the method comprising: generating an encoded inter-process message data set, the inter-process message data set including an encoded message interface file and an encoded message implementation file, the generation of the message includes marshalling of message elements into a message to be sent; and sending the encoded message from the sending first process to the destination second process, the sending first process not being required to wait for a response from the destination second process.

In another embodiment (36), the invention provides a network device adapted for coupling to a network including a plurality of other network devices by a communications link, the network device comprising: a processor and random access memory coupled to the processor, the processor for executing computer program code instructions; a persistent non-volatile memory for storing configuration information and the computer program code instructions; a communications port for sending and receiving messages with other ones of the other network devices; and means for sending and receiving messages.

Exemplary System for Messaging, Gathering Status and Statistics, and/or Non-Persistent or Persistent Setting of Information Across Process Boundaries The above described message structure and messaging method and procedures may be used as an underlying layer to message between processes generally, this messaging may optionally but advantageously also be utilized to communicate (send and/or receive) status, statistics, and other information or data between processes, as well as to set or reset status, data, information, conditions, or memory in at least a non-persistent fashion.

Although the methods and procedures described herein are not limited to any particular system or hardware configuration, optionally but advantageously, the mobility system 100 (See for example FIG. 1) may be used to retrieve statistics, status, and/or other information across process boundaries, by for example using an automated object definition scheme as described above. This scheme may advantageously be XML-based or non-XML-based. This allows statistical (STATistical), status (STATus), and/or other information (generally referred to herein as STAT) to be specified in terms of objects using XML or other object oriented or definitional languages. Application Program Interfaces (APIs) and implementation files may be generated in, by way of example but not by way of limitation, the C programming language. In a non-limiting embodiment, the system is independent of hardware, operating system, and interprocess transport layer or scheme.

It is desirable to simplify STAT or per-STAT information massaging or acquisition program code as much as possible from the developer, hiding or at least relieving the developer from any need to understand the complexity in any STAT infrastructure. This simplification or higher level abstraction may generally result in faster and less expensive code development and more robust code.

Figure 4:
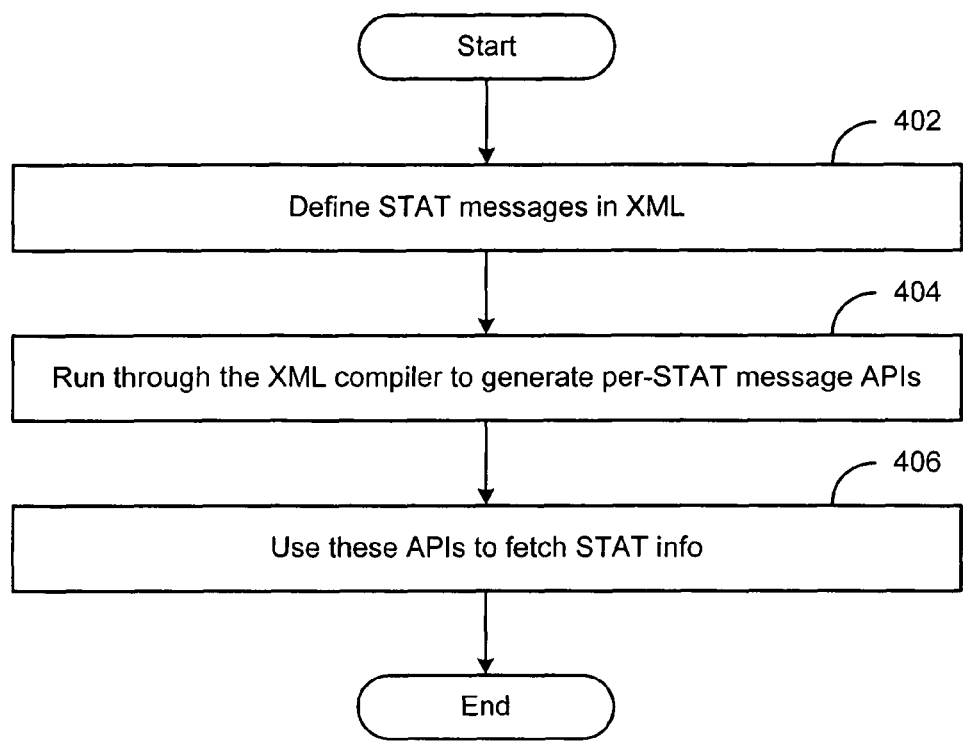
FIG. 4 depicts a flowchart of some basic steps in an exemplary embodiment of a STAT message design process according to an embodiment of the invention.

FIG. 4 depicts a flowchart 400 of some basic steps in an exemplary code development and design process. In the example of FIG. 4, the flowchart 400 starts at module 402 where STAT messages are defined in a high level language such as the XML language. The flowchart 400 continues at module 404 where the STAT messages are run through a converter, such as through an XML compiler to generate per-STAT message APIs. The flowchart 400 ends at module 406 where the APIs are used to fetch, gather, or otherwise obtain the desired statistical, status, or other (e.g., STAT) information from another process.

Figure 5:
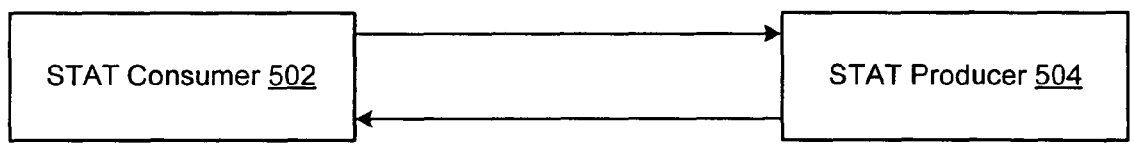
FIG. 5 depicts a high level view of a STAT model according to an embodiment of the invention consisting of two components, a STAT producer and a STAT consumer.

FIG. 5 depicts a high-level view of an embodiment of a STAT messaging model 500 comprising two primary components, a STAT producer 502 and a STAT consumer 504. The STAT producer 502 may include a STAT message dispatcher. In one non-limiting embodiment, a STAT message dispatcher takes message types and determines which callback function to call. In a non-limiting embodiment, the STAT consumer 504 is in a Configuration (CFG) process, such as for example a configuration process associated with the network configuration of a wireless network switch device, while the STAT producer 502 is typically in a network operating system or network system process, such as in a network manager process. Note, however, that the STAT producer 502 and STAT consumer 504 could simultaneously exist in other places as well (such as for example in a situation where the NOS process could be a consumer in one process and another external process could be a producer of STAT information).

It may be appreciated that many multitasking systems do not have a systematic way in which to obtain, send, retrieve, or otherwise exchange or transfer statistical, status, or other information or data between processes. This being the case, each software or code developer tends to define his/her own way in which to retrieve and/or send this information. It is desirable to provide a scheme in which to not only define this information in a generic way, but also to automatically generate interfaces, such as for example Application Programming Interfaces (APIs) and implementation code and any ancillary interface information which developers can use to easily obtain, send, transfer and/or retrieve such information or data. Among its advantages, such an approach saves development time and increases code and process stability.

This approach also advantageously allows statistical and status information to be specified in terms of objects using a higher-level and more intuitive language such as the exemplary XML language. APIs may for example be generated in the C programming language or other implementation languages. Furthermore, the approach is advantageously independent of hardware, operating system, and interprocess transport schemes.

An embodiment of the overall design of the architecture, structure, method, and procedure for collecting or retrieving statistics and status (STAT) and other information in a multi-process environment is now described. In particular, the invention provides a means and mechanism for STAT information to be passed across process boundaries. This description includes a high-level description of the transport mechanism used to transfer STAT information between processes as well as detailed descriptions of software Application Program Interfaces (APIs) that may be used by developers.

The invention provides a mechanism for communicating the STAT information across process boundaries so that the STAT information that may be resident in the first process may be obtained and utilized in the second process or vice versa.

It will be appreciated in light of the description provided herein that the APIs are provided by way of example, and not by way of limitations and that different and other APIs may be developed and used in accordance with the invention. The description includes the software architecture and the APIs provided to or for applications. The applications may for example include but are not limited to applications on network switches operating under a network based system.

Figure 6:
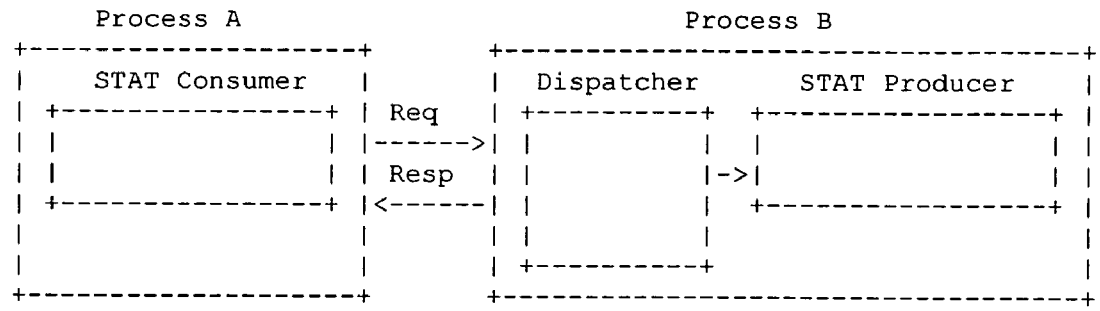
FIG. 6 depicts a high-level view of an embodiment of a STAT information model that may include a STAT information producer and a STAT information consumer.

With reference to FIG. 6, a high-level view of the information retrieval or STAT model may include two components, an information producer (such as a status or statistical "STAT" information producer) and an information consumer (such as a status or statistical "STAT" information consumer). The STAT consumer would typically reside inside the a first process (e.g., Process "A"), such as for example in a device configuration (CFG) process, while the producer may typically reside in a second process (e.g., Process "B") which may for example be in one non-limiting embodiment, a network process that is somehow associated with the exemplary device process. In one non-limiting embodiment of the invention wherein the two processes are processes within a network switch, the configuration process is the process responsible for configuring settings or parameter of the switch and the network process is responsible for providing one or more parameters or status information items.

It may be appreciated however, that the producer and consumer could simultaneously exist or reside in other places as well (for example, the first process could be a STAT consumer and another external process could be a producer of STAT information). Furthermore, the invention is not limited to any particular environment, such as a network environment, or to any particular process or processes within a particular network device, such as a network switch device.

Figure 7A:
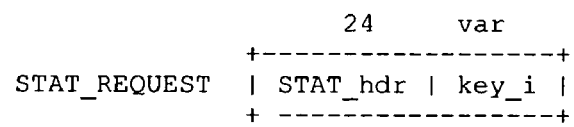
FIG. 7 depicts an exemplary embodiment of a structure of a STAT request and a STAT response.
Figure 7B:
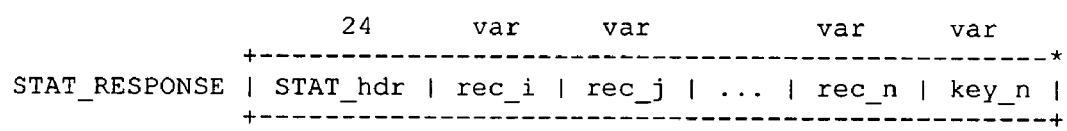

In the exemplary embodiment of FIG. 7, the information consumer in a first process is a STAT consumer in an exemplary configuration process generates a status or statistical information (e.g., STAT) request, and sends the request to a second process which in this example is a network process, wherein it may be received by the STAT producer, optionally via a dispatcher. The second or STAT producer process then takes up the request, and generates a response that it sends back to the first STAT consumer in the first or configuration process, optionally via a dispatcher. In one embodiment, a STAT dispatcher receives a STAT message, decodes the message based on the received message type, and then provides and optionally executes the appropriate callback function.

In one non-limiting embodiment, the design process involves three basic steps: (1) Define STAT "messages" in a high level descriptive or programming language, such as in the XML language, (2) Run the high-level descriptive language through an appropriate compiler, such as XML language through an XML compiler, to generate per-STAT message Application Program Interfaces (APIs), and (3) Use these APIs to fetch or otherwise obtain the STAT information needed by one process from another process.

Exemplary STAT Message Formats

Exemplary STAT Message formats are now described. In one non-limiting embodiment, the STAT messages may be considered as a special class of the generic network-type inter-process messages as described herein before. In one embodiment, STAT messages may contain a STAT header, keys, and one or more records; however, some of these may be absent or null. In embodiments that utilize an implementation or header file, the header or implementation may be required in the request and in the response to that request, but the other elements are optional including for example the keys which may be absent or null. FIG. 7(*a*) shows an exemplary structure of a STAT request and FIG. 7(*b*) shows an exemplary structure of a STAT response.

An exemplary embodiment of a STAT header (or interface description) for the STAT request (e.g., STAT_REQUEST) and STAT response (e.g., STAT RESPONSE) are illustrated in FIG. 8. It may include a plurality of fields or appropriate size, such as six 4-byte fields in one none-limiting embodiment. The length field indicates the total size or number of elements (e.g. number of octets) in the message, not including the STAT header. The sequence number (seqnum) field indicates an ever-increasing message sequence number. Other or different numbering schemes may alternatively be used. The number of records (num_rec) field indicates the total number of records included in the message, but does not include keys. The flags field uses a zero bit (bit 0) to indicate exact or next (bit 0=exact_next), where if bit 0=0 then a Get-Exact operation is indicated and if bit 0=1, a Get-Next operation is indicated; and a one bit (bit 1) to indicate first or not first (bit 1=first) where if bit 1=1 a first operation is indicated and if bit 1=0, a not-first operation is indicated. The result field indicates a returned result from operation, and is typically only used in response message. The last record (lastrec) field indicates an Offset to the last record in the message, and is counted as the number of bytes from the start of the message body, where in at least one non-limiting embodiment, the message body starts immediately after the message header.

The record and keys use the generic inventive message format described relative to the general messaging described herein before relative to marshalling and shown in FIG. 9. The structure in FIG. 9 also shows the format of a general message type, even when that general message is not requesting or communicating status or statistics. Some fields (such as for example the "key" field may be null field however for a generalized message. The STAT type messages may generally provide and utilize the "key" element as set forth in the DTD for the STAT message type in Table 9. The key element includes reference information on the process on the other side for the STAT message to return, and the returned response stat message includes a similar key or reference information for use by the receiver of the response. When a general message does not need to reference or have information returned, the key is not needed. The record and key may include a variable length message type (e.g., msg_type) field that indicates a len/string defining the type of generic message; a four-byte number of parameters (num_par) field identifying the number of parameters in the record/key; and a parameters (param) field, that indicates the parameters encoded with parameter identifier (ID), parameter type, parameter length (len), and parameter value. A return status code is or may optionally but advantageously be sent in the STAT response message as part of a STAT operation.

Exemplary STAT Message Definitions

In one non-limiting embodiment, messages are advantageously defined in XML; however, other languages may be used to define or specify messages. A message incorporating a new STAT element is defined as follows in Table 9, showing an exemplary DTD for a STAT message. The STAT message element provides an extension over and above the general message type described herein before, in that for at least on non-limiting embodiment, the STAT message element comprises a feature that provides a capability for returning an information item (such as for example some value, statistical information or plurality of information items, or some status or set of status, or a combination of these) from another process so that the statistical, status, or other information may be requested from across a process boundary without many of the negative impacts that may be incurred using conventional inter-process messaging or information gathering techniques. As described above, the message structure and format includes a "key" element that permits reference from the STAT message sender requesting the information, and another key that is included with the message back from the other responding process so that the process receiving the response has a reference to match it back with either the requested information or with the requesting process. Comparison between the general "MESSAGE" and the "STAT-MESSAGE" are apparent from a comparison of the exemplary DTD descriptions in Table 1 and Table 9.

The STAT type message is a more complex and complicated message type than the generalized message, at least in part because of the need have information returned from the destination process back to the originally requesting origination process. Some of these additional application program interfaces (APIs) and code are described in greater detail herein below. One of the optional features that may advantageously be included with the STAT type message is an indicator, parameter, flag, field, pointer, or the like having at least two possible states that indicates whether the message should be executed as a synchronous communication or message, or as an asynchronous communication or message.

Several parameter types are identified and these parameter types will be understood to be exemplary and non-limiting as workers in the art will appreciate in light of the description provided herein that other and different types of parameters may be added.

STAT-MESSAGE generates the interfaces for statistics, which automatically create both the request and the response prototypes, and provides either one of the synchronous and asynchronous prototypes. Later in this description and in the related applications is described a NPS-MESSAGE type will be described which generates the interfaces for persistent or non-persistent set of information or state type operations, and which automatically creates both request and response prototypes, with no user data returned in the response. The set operation is non-persistent in the target process and may be made persistent in the target process by directing the receiving process to save or store the state that is communicated by the NPS message.

TABLE 9

Exemplary DTD for STAT Message (STAT-MESSAGE)

```
<!-- dtd for STAT message -->
<!ELEMENT   CATALOG (STAT-MESSAGE*)>
<!ATTLIST   CATALOG
            catalogname NMTOKEN #REQUIRED>
<!ELEMENT   STAT-MESSAGE (STAT-PARAMETER*)>
<!ATTLIST   STAT-MESSAGE
            callname ID #REQUIRED>
<!ELEMENT   STAT-PARAMETER EMPTY>
<!ATTLIST   STAT-PARAMETER
            id    CDATA #REQUIRED
            name  CDATA #REQUIRED
            type  (INT32|UINT32|INT64|UINT64|OPAQUE|STR|
            SEQ)    #REQUIRED
            key   (YES|NO) "NO"
            cfg-link CDATA
```

Parameter type SEQUENCE is a special and optional parameter type that is used to define a list of elements within a message. These list elements may also or alternatively be defined to be messages. This allows embedding one or more levels of messages within a message. This functionality may generally be useful for more complex data structures where one or more levels of lists or other data structures are attached to a main structure. General STAT APIs used to support sequences are described herein elsewhere.

A sample STAT catalog and message would look something like the example in Table 10. The "name" identifies the attribute via a user-defined string. The "type" identifies the type of the attribute (integer, string, etc). The "key" indicates whether the attribute is to be sent in the request message. Typically, the parameters which uniquely identify the record define the key. However, it is also possible to add other parameters to the key which may be used as filters in the request.

It may be appreciated that a message catalog my include general messages, information passing, status, and/or statistics (STAT) type messages, as well as persistent or non-persistent set (NPS) messages in the same catalog. Alternatively different catalogs may be used for different message types.

TABLE 10

Exemplary STAT Catalog and Message

```
<CATALOG catalogname="aaa">
    <!-- Admin user session information
    -->
```

TABLE 10-continued

Exemplary STAT Catalog and Message

```
    <STAT-MESSAGE callname="aaa_admin_session">
        <!-- TTY used -->
        <STAT-PARAMETER name="tty" type="INT32"
        key="yes"/>
        <!-- Name of the user -->
        <STAT-PARAMETER name="username" type="STR" />
        <!-- session time -->
        <STAT-PARAMETER name="time" type="INT32" />
    </STAT-MESSAGE>
    <!-- Define additional messages here
    -->
</CATALOG>
```

Exemplary STAT Code and API Generation

Computer program software code for the implantation and interface files (where required) is generated after the STAT messages have been fully defined in the defining language (such as in the XML language), by running through a compiler (for example, through an XML compiler when the defining language is XML) which produces an output code in the target output language, such as C code. An interface file, such as the header or h-file may also be generated as for the general message file described herein before above. It will be apparent to those workers in the art in light of the description provided herein that although aspects of the invention are described relative to XML as the high-level defining language, and to a C-language file as the compiler output language, the invention is not limited to these particular exemplary languages. By way of example, and as described relative to general messages, but not limitation, the defining language may be XML or any other language; and the compiled output language may be C, C++, or any other language, and that the defining language may generally be used with an appropriate compiler to generate any of the possible output codes.

While it will be appreciated that any languages may be used, the inventive system, method, technique, and computer programs and computer program product for general messages, information or STAT messages, and for interprocess persistent or non-persistent set messages, advantages do arise from using XML as a high level intuitive language and outputting to C, C++ or one of the related languages, which are commonly used for contemporary programming features. This choice of languages may therefore also be considered a novel and non-obvious aspect of at least some embodiments of the invention.

Figure 10:
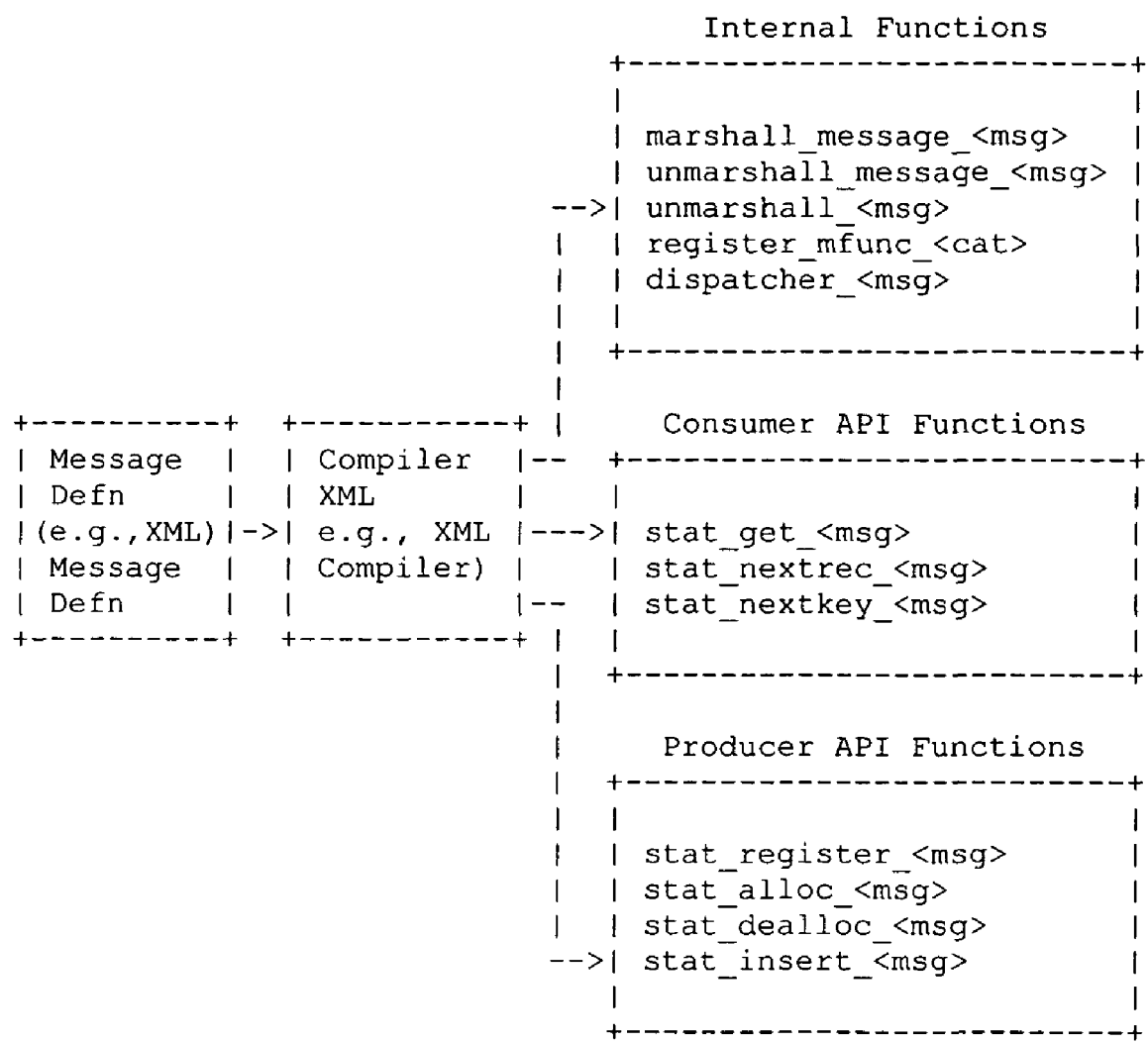
FIG. 10 depicts some of the functions that are automatically generated by the message converter such as by a compiler.

There are several functions that may advantageously be automatically generated for each STAT message defined. These functions comprise the Application program Interface (API) which developers may then use when implementing STAT gathering or retrieval. FIG. 10 shows by way of example, some of the functions that are automatically generated by the compiler, and what the STAT message transformation or conversion tool (in some embodiments the STAT message compiler). Some functions are internal functions such as marshall message, unmarshall message, unmarshall, register marshall function, and dispatcher functions (for example, in some exemplary embodiments these functions may include marshall_message_<msg>, unmarshall_message_<msg>, unmarshall_<msg>, register_mfunc_<cat>, and dispatcher_<msg>) that may be used by the message producer and consumer, and the rest of the functions are used by the STAT message consumer (for example, stat_get_<msg>, stat_nextrec_<msg>, and stat_nextkey_<msg>) and the STAT message producer (e.g., stat_register_<msg>, stat_alloc_<msg>, stat_dealloc_<msg>, and stat_insert_<msg>).

As illustrated in FIG. 10, some of the auto generated APIs are per-message APIs and some are per-catalog auto generated APIs, identified in the Internal functions block by the per-message indicator "<msg>" suffix and the per-catalog indicatior "<cat>" suffix respectively. A set of APIs (internal, consumer, and producer) are automatically generated for each message and for each catalog. The different classes of APIs and members of the classes are described in greater detail below.

In terms of transport mechanism, STAT information will be requested by a STAT consumer and returned by a STAT producer. The STAT consumer sends a STAT request message and the STAT Producer returns a STAT response message. These messages will be organized or marshaled using the marshalling scheme described herein before. The invention is transport mechanism independent and any know or to be developed transport mechanism may be utilized.

Exemplary STAT Application Program Interfaces (APIs)

In at least one non-limiting embodiment of the invention, the STAT model includes application program interfaces. General APIs are used by all STAT-provider and STAT-consumer callback functions and may be common across all message types. They are not typically generated on a per-message or per-catalog basis as are the per-message and per-catalog message specific APIs described below.

TABLE 11

General API: stat_init_producer( )

Syntax:
int stat_init_producer (char *sess_name);
Parameter(s):
Sess_name -- Name of the STAT Producer session
Returns:
Returns a session ID to be used in stat_get_<msg>.
Operation:
API stat_init_producer( ) initializes the STAT Producer, enabling it to accept new sessions from one or more STAT Consumers.

TABLE 12

General API: stat_init_consumer( )

int stat_init_consumer (char *sess_name);
Parameter(s):
Sess_name -- Name of the STAT Consumer session
Returns:
Returns a session ID to be used in stat_get_<msg>.
Operation:
API stat_init_consumer( )establishes a session with the STAT Producer

TABLE 13

General API: stat_alloc

Syntax:
stat_hdl_t * stat_alloc (void);
Parameter(s):
(none)
Returns:
Returns a pointer to a STAT handle to be used in other STAT APIs.
Operation:
API stat_alloc( ) allocates a descriptor, or handle, to hold state information
for the STAT session. Must be called by STAT Consumer before calling stat_get_<msg>.
Must call stat_dealloc( ) after done with handle.

TABLE 14

General API: stat_dealloc

Syntax:
void stat_dealloc (stat_hdl_t *stat_hdl);
Parameter(s):
Stat_hdl -- STAT handle
Returns:
Returns a session ID to be used in stat_get_<msg>.
Operation:
Frees a STAT handle allocated by stat_alloc( ).

TABLE 15

General API: stat_done

Syntax:
void stat_done (stat_hdl_t *stat_hdl);
Parameter(s):
stat_hdl -- STAT handle
Returns:
Returns a session ID to be used in stat_get_<msg>.
Operation:
Used by STAT Producer to return the STAT response message.
Should be called when all records have been sent in the response.
This accommodates an asynchronous case where the STAT Producer
cannot respond to a request in a reasonable amount of time, or does
not want to hold up a network operating system or other network process
waiting to collect data. Once all data has been collected,
stat_done( ) is called. This must be called in all cases.
The stat_hdl is deallocated in stat_done( ).

TABLE 16

General API: stat_seq_count

Syntax:
unsigned int stat_seq_count (stat_hdl_t *seq);
Parameter(s):
seq -- STAT sequence handle
Returns:
Returns the number of records in the sequence.
Operation:
Returns the number of records in the sequence.

TABLE 17

General API: stat_set_errstr

Syntax:
unsigned int stat_seq_count (stat_hdl_t *seq);
Parameter(s):
seq - STAT sequence handle
Returns:
Returns a formatted error string from the STAT Producer to the STAT
Consumer.
Must be called before stat_done( ).
Operation:
Returns a formatted error string from the STAT Producer to the STAT
Consumer.
Must be called before stat_done( ).

TABLE 18

General API: stat_get_errstr char *stat_get_errstr(stat_hdl_t *stat_hdl);
Parameter(s):
stat_hdl -- STAT handle
Returns:
Any error string returned from the STAT Producer. NULL if no error
string present

TABLE 18-continued

General API: stat_get_errstr

Operation:
Used by the STAT Consumer to retrieve any error string returned from the
STAT Producer. NULL if no error string present.

TABLE 19

General API: stat_timeout_set

Syntax:
int stat_timeout_set(stat_hdl_t *stat_hdl, int timeout);
Parameter(s):
stat_hdl -- STAT handle
timeout -- timeout value in seconds
Returns:
Returns 0 upon success, otherwise error.
Operation:
Used by the STAT Consumer to change the timeout value of the
stat_get_<msg> call. Returns 0 upon success, otherwise error.

Exemplary STAT Message Autogenerated APIs

Several auto-generated APIs for the STAT messaging are now described. Autogenerated APIs are typically generated on a per STAT-MESSAGE basis. For example, there is an entire set or plurality of APIs generated that are specific to the given STAT-MESSAGE. This differs from the generalized APIs, which are global and shared across all message types. For each of the below described Autogenerated APIs, the message "<msg>" is the message name defined in the XML message definitions. A stat_<msg> structure is generated for the returned records in the format in Table 20. This stat_<msg> structure is provided for the application programmer to conveniently fill in message parameters in the STAT callback function.

Table 21 through Table 28 provide exemplary descriptions of several autogenerated STAT APIs as well as an exemplary Handler.

The autogenerated API stat_nextrec_<msg> in Table 21 is used by the STAT Consumer to retrieve the next record in a STAT response. The stat handle keeps track of the next record in the response message.

The autogenerated API stat next key stat_nextkey_<msg> in Table 22 is used by the STAT consumer to retrieve the key to be used for the next get request.

The autogenerated API stat_get_<msg> in Table 23 is used to send a STAT request message from STAT Consumer to STAT Producer. In the synchronous case, this function blocks and waits for a STAT response message from the STAT Producer.

The autogenerated API stat_register_<msg> in Table 24 is used by the STAT Producer to register a Producer Handler function for a given message. Whenever a STAT request is received for this message type, this handler is called.

The autogenerated API stat_alloc_<msg> in Table 25 allocates memory for the record of the given message type.

The autogenerated API stat_dealloc_<msg> in Table 26 frees memory for the record of the given message type.

The autogenerated API stat_insert_<msg> in Table 27 is used by the STAT Producer to insert a record into a STAT Response message.

An exemplary Producer Handler in Table 28 is not an autogenerated API, but the registered callback function that is used to process a given type of STAT message.

TABLE 20

Example of stat_<msg> Structure Generated for Returned Records

```
typedef struct stat_<msg>_s {
    . . .
    . . . parameters . . .
    . . .
} stat_<msg>_t;
```

TABLE 21

Autogenerated API: stat_nextrec_<msg>

Syntax:
int stat_nextrec_<msg> (stat_hdl_t *stat_hdl, stat_<msg>_t *rec);
Parameter(s):
stat_hdl -- STAT handle used internally. This handle must be first
    allocated using stat_alloc( );
rec    -- Next returned record. Parameters are defined in the XML
    message
    definition file. Record must be allocated by caller.
Returns:
Returns 0 for success, 1 if no more records, −1 for error.
Operation:
This API is used by the STAT Consumer to retrieve the next record in a
STAT response. The stat_hdl keeps track of the next record in
the response message.

TABLE 22

Autogenerated API: stat_nextkey_<msg>

Syntax:
int stat_nextkey_<msg> (stat_hdl_t *stat_hdl, ...r_keys...);
Parameter(s):
stat_hdl    -- STAT handle used internally. This handle must be first
    allocated using stat_alloc( );
r_keys    -- Returned key parameters of the key of the
    last record in the STAT response.
Returns:
Returns 0 for success, −1 for error.
Operation:
This API is used by the STAT Consumer to retrieve the key to be used for
the next get request in a get-bulk operation. Only needed if calling
stat_get_<msg> more than once. If the calling code keeps track of
the key to the last record in the last response, then it may not be
necessary to call this API.

TABLE 23

Autogenerated API: stat_get_<msg>

Syntax:
typedef int (*stat_cfunc_t) (stat_hdl_t *stat_hdl, uint num_rec,
    uint flags, int result);
int stat_get_<msg> (stat_hdl_t *stat_hdl, int sess_id, uint get_cnt,
    uint flags, stat_cfunc_t func, void *cookie, ...keys...);
Parameter(s):
stat_hdl    -- STAT handle used internally. This handle must be first
    allocated using stat_alloc( );
sess_id    -- Session ID. Returned from stat_init_consumer( ).
get_cnt    -- Specifies the number of records to get.
flags    -- Flags bitfield, must OR flags if more than one used
    STAT_GETNEXT: Get the next entry after the one specified
    by the keys. Not setting this bit implies a
    Get-Exact operation. This bit is not used
    internally by the STAT code, and is only intended
    for the Stat Producer handler.
    STAT_GETFIRST: Indicates that this is the first request of a
    series of requests. This is only needed when
    STAT_GETNEXT is set. It can be used to
    specify the first request in cases where there
    is no logical value of the keys that can signify
    the first request. This bit is not used

TABLE 23-continued

Autogenerated API: stat_get_<msg> internally by the STAT code, and is only intended
    for the Stat Producer handler.
    STAT_ASYNC: Return immediately from function without
    waiting For response. Call function specified in func.
    This bit is used internally and is not intended for
    use by the Stat Producer handler.
func    -- Optional callback function used when STAT_ASYNC is set.
    This function is called after the response message is received.
cookie    -- Optional argument to pass into callback function
keys    -- Message-specific keys as marked in the message definition
Returns:
Returns 0 for success, −1 for error.
Operation:
This API is used to send a STAT request message from STAT Consumer
to STAT Producer. In the synchronous case (default), this function blocks
and waits for a STAT response message from the STAT Producer. The
keys specify the exact record or group of records to retrieve. The
received records are retrieved using stat_nextrec_<msg>.

TABLE 24

Autogenerated API: stat_register_<msg>

Syntax:
int stat_register_<msg> (stat_func_<msg>_t func);
Parameter(s):
func -- Handler function
Returns:
Returns 0 for success, −1 for error.
Operation:
This API is used by the STAT Producer to register a handler function for a
given message. Whenever a STAT request is received for this message
type, this handler is called. The Producer handler is described below.

TABLE 25

Autogenerated API: stat_alloc_<msg>

Syntax:
stat_<msg>_t * stat_alloc_<msg> (void);
Parameter(s):
(none)
Returns:
Returns a pointer to a record for this message type.
Operation:
This API allocates memory for the record of the given message type. All
fields are initialized. This should be used to allocate records which are
inserted into stat_insert_<msg>. Note that only one stat_alloc_<msg>
should be needed per provider callback invocation. This should only be
used by the provider.

TABLE 26

Autogenerated API: stat_dealloc_<msg>

Syntax:
void stat_dealloc_<msg> (stat_<msg>_t *rec);
Parameter(s):
rec -- Pointer to the record to deallocate.
Returns:
(none)
Operation:
This API deallocates a record which was allocated with
stat_alloc_<msg>.

TABLE 27

Autogenerated API: stat_insert_<msg>

Syntax:
int stat_insert_<msg> (stat_hdl_t *stat_hdl, stat_<msg>_t *rec);
Parameter(s):
stat_hdl   -- STAT handle used internally. Received via callback function.
rec        -- Record to send back to STAT Consumer. Allocated by caller.
Returns:
Returns 0 for success or −1 for error.
Operation:
This API is used by the STAT Producer to insert a record into a STAT Response. This function can be called multiple times to insert multiple records. This should be called from within the handler function registered above. Note that the record is reinitialized after it is inserted into the response. Therefore, the caller should not reference any old pointers in the record after an insert.

TABLE 28

Producer Handler

Syntax:
typedef int (*stat_func_<msg>t) (stat_hdl_t *stat_hdl, uint get_cnt, uint flags, ... ...keys...);
Parameter(s):
stat_hdl   -- STAT handle used to pass to APIs called from the handler.
get_cnt    -- Number of records requested.
flags      -- flags field defined in stat_get_<msg>. Note that the following macros can be used to check the bits in the flags field:
             STAT_IS_GETNEXT —True if STAT_GETNEXT flag is set.
             STAT_IS_GETFIRST —True if STAT_GETFIRST flag is set.
keys       -- Key parameters sent in stat_get_<msg>.
Returns:
OK for success. Error otherwise.
Operation:
The Producer Handler is the registered callback function that is used to process the given type of stat message.

Appendix A sets forth some examples associated with statistics, status, and other information (STAT) messaging. The first example is of the STAT Get-Exact operation in which at most one record is retrieved from the STAT Producer. The second example shows a STAT Get-Next operation in which zero or more records are retrieved.

Exemplary Embodiment of System and Method for Persistent and Non-Persistent Setting of Information Across Process Boundaries Limitations of conventional message structures and messaging schemes have already been described relative to interprocess messaging and messaging that retrieves status, statistics, and other information across process boundaries.

In analogous manner, many conventional multi-process multitasking systems do not have a systematic way in which to define and set information, including persistently or non-persistently set information, between processes. As such, each developer conventionally tends to define his/her own way in which to set this information across and between processes. It is therefore desirable to provide a scheme in which to not only define this information in a more general or generic way, but also to automatically generate Application Programming Interfaces (APIs) including implementation code and any interfaces which developers can use to easily transfer and set information or data between and across process boundaries. As with other of the embodiments of the invention, these features save development time and increases code stability.

Therefore, advantageously, a system or device such as but not limited to the mobility system 100 (See FIG. 1) may also be used to set information across process boundaries using an automated object definition scheme. One non-limiting embodiment of this scheme may be XML-based. This allows persistent or non-persistent information to be specified in terms of objects using XML. APIs may be generated in, by way of example but not by way of limitation, the C-programming language. In a non-limiting embodiment, the system is independent of hardware, operating system, and interprocess transport schemes. The use of XML allows information (to be persistently or non-persistent stored or used) to be specified in terms of objects using XML, and APIs are generated in the C-language or other lower level programming language. These exemplary implementations are independent of hardware, operating system, and interprocess transport schemes.

An embodiment of the overall design of the architecture, structure, method, and procedure for a new scheme to perform a Non-Persistent Set (NPS) of information in a multi-process environment is now described. This scheme may also be used to persistently set information across process boundaries by adding an additional store or save in the target process so that he non-persistently set information becomes persistently set. In particular, the invention provides a means and mechanism for the setting (persistently or non-persistently) of information across process boundaries. This description includes an exemplary high-level description of the transport mechanism used to transfer NPS information between processes as well as detailed software APIs to be used by developers.

In one embodiment, much of the computer program code involved in setting NPS information will reside in an external process. The invention provides a mechanism for passing or communicating the information or state to be set across process boundaries so that the information or state to be set resident in one first process may be obtained and utilized in another second process external to the first process.

It will be appreciated in light of the description provided herein that the APIs are provided by way of example, and not by way of limitations and that different and other APIs may be developed and used in accordance with the invention. The description includes the software architecture and the APIs provided to or for applications. The applications may for example include but are not limited to applications on the MX series of network switches operating under a network based system. Systems and switches such as these are made by Trapeze Networks of Pleasanton, Calif.

Figures 13, 14:
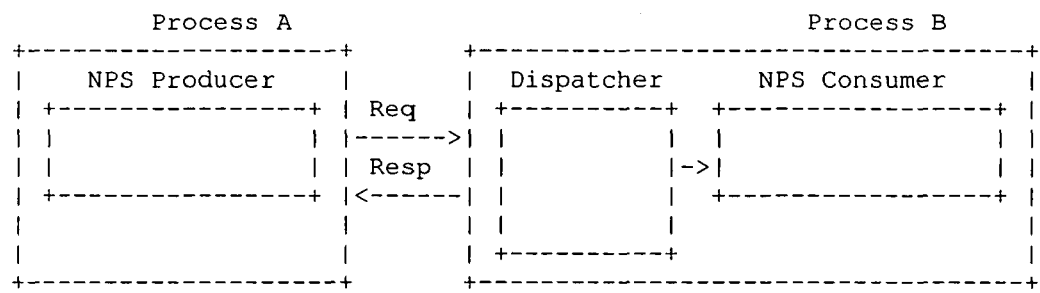
FIG. 13 depicts a exemplary embodiment of record and keys used in an embodiment of the inventive NPS message format.
FIG. 14 depicts a high-level view of the STAT model applied to the Non-Persistent Setting (NPS) of information across process boundaries may include an NPS producer and an NPS consumer, wherein persistent setting requires a save or store at the NPS consumer.
Figure 15:
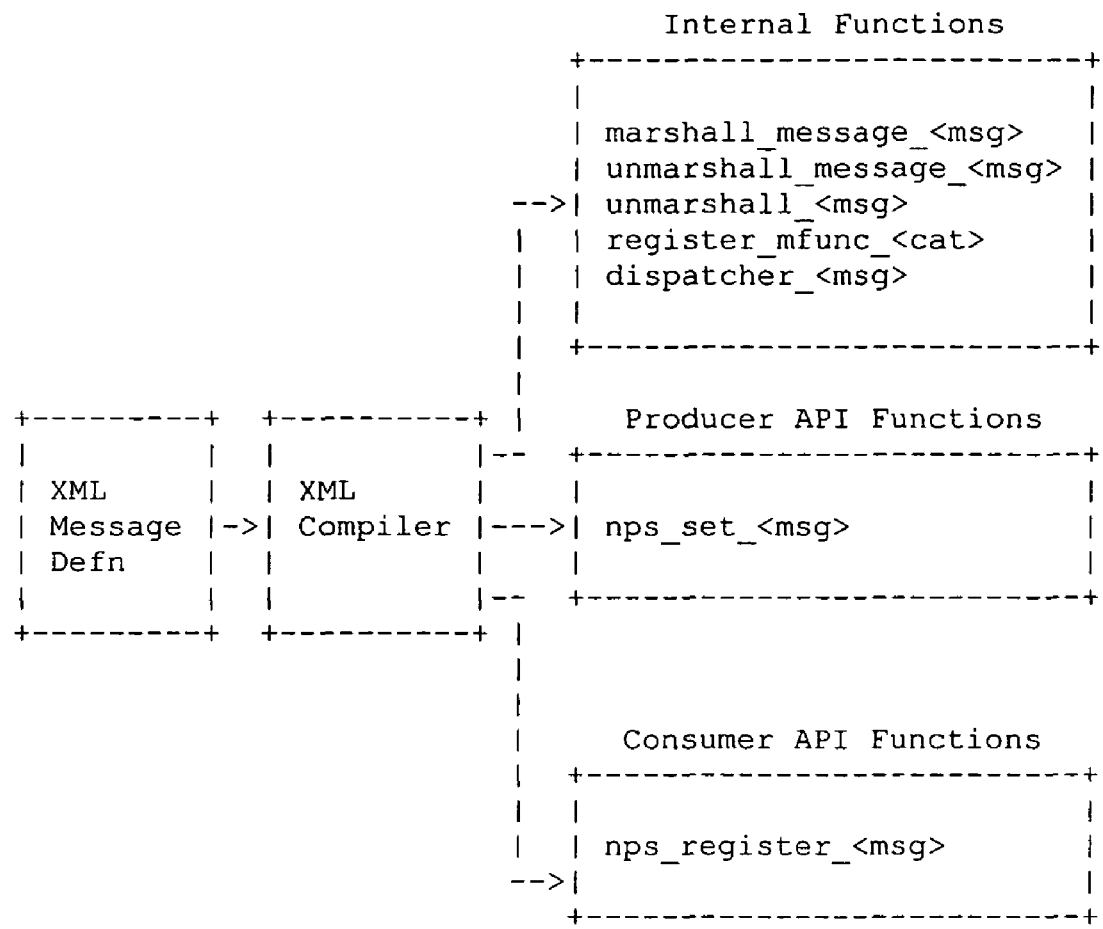
FIG. 15 depicts some of the functions that may automatically be generated by the NPS message converter or compiler.

With reference to FIG. 14, a high-level view of a messaging model applied to the Non-Persistent Set operation may include two components, a NPS producer and a NPS consumer. An additional save or storage of the information at the NPS consumer may persistently save the non-persistently set information at the information consumer making that consumer a persistently set (PS) consumer.

The NPS message producer would typically reside inside one process, for example in a network device configuration first process while the NPS message consumer may reside in a different second process, such as for example in a second device or network process. Note that the consumer and producer processes may be viewed as being swapped or exchanged for the NPS model as compared to the STAT model processes. In the STAT model, a first process is requesting information from a second process, and in the NPS model a first process is sending an information or command or a set of information or command(s) to another process. Stated differently relative to our earlier example, in at least one embodiment of the STAT model, the STAT information consumer is in the configuration process and the STAT information producer is in the network process; while in the NPS model, the NPS consumer is in the network process and the NPS producer is in the configuration process. These configuration and network processes are merely convenient examples as it will be understood that the two different processes for which the inter-process messaging is occurring can be any processes.

It may be noted, however, that the producer and consumer could simultaneously exist or reside in other places as well (for example, the network process could be a NPS producer and another external process could be a consumer of NPS information). Furthermore, the invention is not limited to any particular environment, such as a network environment, or to any particular process or processes within a particular network device, such as a network switch device.

In the exemplary embodiment of FIG. 14, the NPS producer in the configuration (CFG) process generates a NPS request, and sends the request to the network process, and may be received by the NPS consumer (via an optional dispatcher). The NPS consumer then takes up the request, and generates a response that it sends back to the NPS producer in the configuration process, optionally via a dispatcher.

In one non-limiting embodiment, the NPS design process involves three basic steps: (1) define NPS "messages" in a high level descriptive or programming language, such as in the XML language; (2) run the high-level descriptive language through an appropriate message transformation or modification tool such as an NPS message compiler (such as XML language high-level descriptive language through an XML compiler), to generate per-NPS message Application Program Interfaces (APIs); and (3) use these APIs to set the NPS information in one process from another process.

Exemplary NPS Message Formats

The Non-Persistent Set (NPS) messages are a special class of the generic inventive message described above and use substantially the same message format as the STAT information messages described herein elsewhere with reference to FIG. 7, FIG. 8, and FIG. 9 and are not repeated here. These NPS message formats are shown in FIG. 11, FIG. 12, and FIG. 13. In fact, in at least one embodiment, the NPS message format is the same as the STAT message format. Although the NPS message format may be the same as the STAT format, the information contained in the message may differ.

One difference in the NPS implementation as compared to the STAT implementation is that all NPS message parameters (NPS-PARAMETERs) may (inherently) be defined as key parameters and are therefore sent as keys in the NPS request message. Furthermore, there are no (or at least need not be any) records returned in the NPS response (as compared to the STAT response) message, only an optionally but advantageously returned status code. The status code may for example merely provide an indication that the message was received or completed successfully or some other indication of success, or failure, or error. There can be zero, one, or a plurality of NPS parameters (NPS-PARAMETERs). As with the STAT-message, a return status code is or may optionally but advantageously be sent in an NPS response message as part of a NPS operation.

Exemplary NPS Message Definitions

A exemplary new NPS message element is defined as in Table 29, showing an exemplary DTD for an NPS message. The NPS message element differs from a STAT message in that different APIs are generated and the results are different. Some of these differences are apparent from the different DTD description of an NPS-Message, while other differences will be apparent from the different APIs and code generated when processed through the NPS message transformation or conversion tool, such as for example an NPS message compiler.

TABLE 29

Exemplary DTD for NPS Message

```
<!--dtd for NPS message -->
<!ELEMENT CATALOG (NPS-MESSAGE*)>
<!ATTLIST CATALOG
    catalogname NMTOKEN #REQUIRED>
<!ELEMENT NPS-MESSAGE (NPS-PARAMETER*)>
<!ATTLIST NPS-MESSAGE
    callname ID #REQUIRED>
<!ELEMENT NPS-PARAMETER EMPTY>
<!ATTLIST NPS-PARAMETER
    id CDATA #REQUIRED
    name CDATA #REQUIRED
    type (INT32|UINT32|INT64|UINT64|OPAQUE|STR) #REQUIRED
```

An NPS message (NPS-MESSAGE) generates the interfaces for persistent or non-persistent set operations, and automatically creates both request and response prototypes, with no user data returned in the response.

A non-limiting embodiment of an exemplary sample catalog and message may have the form illustrated in Table 30. The "name" identifies the attribute via a user-defined string. The "type" identifies the type of the attribute (integer, string, etc). Several parameter types are identified, and these types will be understood to be exemplary and non-limiting as workers in the art will appreciate in light of the description provided herein that other and different types of parameters may be added.

TABLE 30

Exemplary structure for NPS Catalog and Message

```
<CATALOG catalogname="memorycatalog">
    <NPS-MESSAGE callname="memleak_set">
        <NPS-PARAMETER id="1" name="enable" type="UINT32"/>
    </NPS-MESSAGE>
</CATALOG>
```

Exemplary NPS Code Generation

Code for execution is generated after the NPS message has been fully defined in the defining language (such as in a DTD file using the XML language), by running through a transformation tool or converter such as a compiler (for example, through an XML compiler when the defining language is XML) which produces an output code in the target output language, such as C language code. It will be apparent to those workers in the art in light of the description provided herein that although aspects of the invention are described relative to XML as the high-level defining language, and to C as the compiler output language, the invention is not limited to these particular languages. As for the general message or information message, any programming language may be used and the transformed or compiled output interface and implementations files may be used, though definition in the XML language and implementation in the C-language may be preferred.

There are several functions that may automatically generated for each NPS message defined. These functions comprise the Application program Interface (API) which developers may then use when implementing NPS setting. FIG. 12 shows by way of example, some of the functions that may automatically be generated by the compiler. Some functions are internal functions (e.g., a marshal message "marshall_message_<msg>" function, an unmarshall message "unmarshall_message_<msg>" function, an unmarshall "unmarshall_<msg>" function, a register catalog "register_mfunc_<cat>" function, and optional dispatcher "dispatcher_<msg>" function) which are typically only used by the NPS engine and the rest of the functions are used by the NPS message consumer (e.g., NPS register "nps_register_<msg>") and the NPS message producer (e.g., nps_set_<msg>).

In terms of transport mechanism, NPS information will be requested by a NPS producer process and returned by a NPS consumer process. The NPS producer sends a request message and the NPS consumer optionally returns a response message. These messages will be marshaled using the marshalling scheme described herein before. The invention is transport mechanism independent.

FIG. 12 shows the functions that are automatically generated by the NPS transformation tool or compiler. Some are internal functions which are only used internally and the rest are used by the consumer and producer of NPS messages.

Exemplary NPS Application Program Interfaces (APIs)

There are some general NPS APIs as well as NPS APIs which are automatically generated.

In at least one non-limiting embodiment of the invention, the NPS messaging model includes application program interfaces. General APIs are used by all NPS producer and NPS consumer callback functions when present and are common across all message types. They are not typically generated on a per-message or per-catalog basis as are the per-message and per-catalog message specific APIs described below.

The NPS general API: NPS set "nps_set_<msg>( )" in Table 34 is used to send an NPS request message from NPS Producer to NPS Consumer.

The NPS general API: NPS register "nps_register_<msg>( )" in Table 35 is used by the NPS Consumer to register a Consumer Handler function for a given message.

The NPS general API: NPS delete error string "nps_delete_errstr( )" in Table 33 is used by the NPS Consumer to delete an error string that was returned from NPS set "nps_set_<msg>".

TABLE 31

NPS General API: nps_done

Syntax:
void nps_done (nps_hdl_t *nps_hdl);
Parameter(s):
nps_hdl -- NPS handle
Returns:
(none)
Operation:
Used by NPS Consumer to return the NPS response message.
Should be called when all processing is complete.
This accommodates an asynchronous case where the NPS Consumer
cannot respond to a request in a reasonable amount of time,
or does not want to hold up NOS waiting to process data. Once
all data has been processed, nps_done( ) is called. This
must be called in ALL cases. nps_hdl is
deallocated in nps_done( ).

TABLE 32

General API: nps_set_errstr

Syntax:

void nps_set_errstr(nps_hdl_t *nps_hdl, char *fmt,...);
Parameter(s):

nps_hdl - - NPS handle
Returns:

Returns a formatted error string from the NPS Consumer to the NPS Producer.

Must be called before nps_done( ).
Operation:

Returns a formatted error string from the NPS Consumer to the NPS Producer.

Must be called before nps_done( ).

TABLE 33

General API: nps_delete_errstr

Syntax:

char *nps_delete_errstr(char *errstr);
Parameter(s):

errstr - - Error string to free
Returns:

Null
Operation:

Used by the NPS Consumer to delete an error string that was returned from nps_set_<msg>.

Exemplary NPS Autogenerated APIs

Several Autogenerated APIs for the NPS messaging are now described. For each of the below described Autogenerated APIs, <msg> is the message name defined in the XML message definitions. A nps_<msg> structure is generated for the returned records in the format in Table 34. This nps_<msg> structure is provided for the application programmer to conveniently acquire message parameters in the NPS callback function.

Tables 35 through 37 provide exemplary descriptions of several autogenerated STAT APIs.

The NPS general API: nps_set_<msg>( ) in Table 34 is used to send an NPS request message from NPS Producer to NPS Consumer.

The NPS general API: nps_register_<msg>( ) in Table 35 is used by the NPS Consumer to register a Consumer Handler function for a given message.

The NPS Consumer Handler (and not an API) in Table 36 is the registered callback function that is used to process a given type of NPS message.

TABLE 34

Example of nps_<msg> Structure Generated for Returned Records typedef struct nps_<msg>_s {
    ...
    ... parameters ...
    ...
} nps_<msg>_t;

TABLE 35

Autogenerated NPS API: nps_set_<msg>

Syntax:

int nps_set_<msg> (int sess_id, char **errstr, ...parameters...);
Parameter(s):

| | |
|---|---|
| sess_id | - - Session ID. Returned from stat_init_consumer( ). |
| errstr | - - Optional pointer to returned error string. If errstr is given as non-NULL, a pointer to an error string will be returned if an error exists. NULL will be returned if no error string exists. If the caller does not want to use this feature, then errstr should be set to NULL on input. errstr should be deleted (freed) using nps_delete_errstr( ). |

Returns:

Returns 0 for success, −1 for error.
Operation:

This API is used to send a NPS request message from NPS Producer to NPS Consumer. This function blocks and waits for an NPS response message from the NPS Consumer. The parameters specify all data to set.

TABLE 36

Autogenerated NPS API: nps_register_<msg>

Syntax:

int nps_register_<msg> (nps_func_<msg>_t func);
Parameter(s):

func - - Handler function
Returns:

Returns 0 for success, −1 for error.
Operation:

This API is used by the NPS Consumer to register a handler function for a given message. Whenever an NPS request is received for this message type, this NPS consumer handler is called.

TABLE 37

Autogenerated NPS API: NPS Consumer Handler

Syntax:

typedef int (*nps_func_<msg>t)(nps_hdl_t *nps_hdl, ...parameters...);
Parameter(s):

| | |
|---|---|
| nps_hdl | - - NPS handle used to pass to APIs called from the handler. |
| parameters | - - Parameters sent in nps_set_<msg>. |

Returns:

OK for success. Error otherwise.
Operation:

The NPS Consumer Handler is the registered callback function that is used to process a given type of NPS message.

Appendix B sets forth some examples associated with information setting messages, such as persistent or non-persistent setting (NPS) messaging. The example is of the NPS Set Memory Leak example operation.
Additional Description As used herein, the term "embodiment" means an embodiment that serves to illustrate by way of example but not limitation.

It will be appreciated to those skilled in the art that the preceding examples and preferred embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

We claim:

1. A method comprising:
receiving, at a processor, a message definition in a first language from a tool, the message definition having been previously received by the tool in a second language different from the first language;
defining, at the processor, an application program interface module based on the message definition in the first language;
receiving, at the application program interface module, an information set request in the first language from a consumer process;
defining, at the application program interface module, a message in the first language in response to receiving the information set request, the message including the information set request; and
sending, from the application program interface module, the message to a producer process.

2. A method as in claim 1, wherein the message is a first message, the method further comprising:
receiving, at the application program interface module, a response from the producer process, the response including a status of an information set operation in the consumer process; and
defining, at the application program interface module, a second message including the response; and
sending, from the application program interface module, the second message to the consumer process.

3. A method as in claim 2, wherein the status is selected from the set consisting of an error status and a success status.

4. A method as in claim 1, wherein the information set request includes a request for state information.

5. A method as in claim 1, wherein one of the producer process or the consumer process is a configuration process to configure settings or parameters of a network switch and the other of the producer process or the consumer process is a network process to provide one or more parameters or status information items.

6. A method according to claim 1, wherein the message is one of a persistent set (PS) or non-persistent set (NPS) operation type message.

7. A method according to claim 6, wherein the message is an NPS operation in a target process, the NPS operation being made persistent in the target process by directing the target process to save or store information that is communicated by the message.

8. A method according to claim 1, wherein a process boundary is disposed between the consumer process and the producer process.

9. A method according to claim 1, wherein the message is a non-persistent set message type, the method further including persistently setting information at the consumer process by executing an additional save or storage operation of the information at the consumer process.

10. A method according to claim 1, wherein the producer process includes a first network device configuration process and the consumer process includes a second network device configuration process.

11. A method according to claim 1, wherein the producer process resides and executes in a configuration process and generates an NPS request; the producer process sends the generated NPS request to a network process; the NPS request is received by the consumer process, via a dispatcher; and the consumer process takes up the request, and generates a response that the consumer process sends back to the producer process in the configuration process, via a dispatcher.

12. A method as in claim 1, wherein the message being a non-persistent set (NPS) operation type message.

13. A method as in claim 12, wherein the NPS operation type message provides at least one of: an NPS message header, a key, or a message record.

14. A method as in claim 13, wherein the NPS operation type message provides at least one of: a null or absent key, or a null or absent message header.

15. A method as in claim 12, wherein the NPS operation type message includes a header or implementation file in the information request and in a response to that information set request.

16. A method as in claim 1, wherein the message includes an NPS header or interface description for an NPS information request and an NPS information response.

17. A method as in claim 16, wherein the NPS header or interface description includes:
    a length field indicating a size of the message not including any NPS header;
    a sequence number field indicating a message sequence number;
    a number of records field indicating a total number of records included in the message not including any message keys that might be present; and
    an optional result field indicating a returned result from an operation.

18. A method according to claim 1, wherein the message includes a key parameter sent as a key in the information set request.

19. A method according to claim 1, further including receiving a status code from the producer process, the status code indicating that (1) the message was received or completed successfully; or (2) that the message was not received, not completed successfully, or that an error occurred.

20. A method as in claim 1, wherein the message is defined by a document definition type.

21. A method as in claim 1, wherein the information set request comprises an NPS message that is defined in the XML programming language.

22. A method as in claim 1, wherein the information set request includes a capability for causing an information item to be returned from the producer process across an inter-process boundary.

23. A method as in claim 22, wherein the information item is one of: a value, statistical information, a status, or a state.

24. A method as in claim 1, wherein the information set request comprises an NPS message and includes a first key element that permits reference from an NPS message sender requesting the setting of information, and a second key element that is included with the message back from the consumer process so that the consumer process has a reference to match the response back with either the requested setting of information or with the producer process.

25. A method as in claim 1, wherein the information set request comprises an NPS message for setting information from a producer process into a consumer process; and the NPS message includes an indicator that has at least two states and identifies whether the NPS message should be executed as a synchronous communication or as an asynchronous communication.

26. A method as in claim 1, wherein the message comprises an NPS message that generates interfaces for setting information and the interfaces automatically create both request and optional response message prototypes.

27. A method as in claim 1, wherein the message comprises an NPS message that generates interfaces for setting information in the consumer process, the interfaces (1) automatically create both request message prototypes and optional response message prototypes, and (2) provide either synchronous or asynchronous prototypes.

28. A method as in claim 1, wherein the tool comprises an NPS message compiler.

29. A method as in claim 1, wherein the message definition is associated with a function selected from the set of functions including: marshall, unmarshall, register, dispatch, set, next record, next key, allocate, deallocate, insert, and combinations of these functions.

30. A method according to claim 1, wherein the message comprises an NPS message that selectably generates interfaces for persistent and non-persistent set operations, and automatically creates both a request prototype and an optional response prototype without user data returned in the response.

31. A method according to claim 1, wherein the message includes a name attribute, a type attribute, and at least one parameter type attribute.

32. A method as in claim 1, wherein sending the message to the producer process includes sending the message to the producer process from an application programming interface (API).

33. A method as in claim 1, wherein the message comprises an NPS message and the method further comprises providing an NPS message interface that enables a messaging mechanism for setting of state information.

34. A method as in claim 1, wherein the message is a first message, the method further comprising:
    receiving, at the application program interface module, a response from the producer process, the response including an operation status of an information set operation of the consumer process associated with the information set request; and
    defining, at the application program interface module, a second message including the response; and
    sending, from the application program interface module, the second message to the consumer process.

35. A method according to claim 1, further including receiving a second message definition in the first language from the tool, the second message definition having been previously received by the tool in the second language different from the first language.

36. A method according to claim 35, wherein the second message definition being used to define an NPS request message from the producer process to the consumer process.

37. A method as in claim 1, wherein the second language comprises XML.

38. A method as in claim 37, wherein the first language comprises C programming language.

39. A method, comprising:
    receiving, at a processor, a message definition in a first language; and
    defining, at the processor, an application programming interface (API), the API including the message definition in a second language different from the first language,
    the API configured to (1) receive an information request in the second language from a consumer process, (2) define a message in the second language based on the message definition, the message including the information request, and (3) send the message to a producer process.

40. A system, comprising:
a memory storing an application programming interface (API) configured to include a message definition in a first language, the message definition having been received by a tool in a second language different from the first language,
the API configured to receive an information request in the second language from a consumer process,
the API configured to define a message in the second language based on the message definition in response to receiving the information request, the message including the information request,
the API configured to send the message to a producer process.

41. The system of claim 40, wherein the message is a non-persistent set (NPS) type message.

42. The system of claim 40, wherein the memory stores the tool, the tool is configured to translate the message definition from the second language to the first language to define the API.

43. The system of claim 40, wherein the API is configured to be used by a callback function.

44. The system of claim 40, wherein the message is a first message of a first message type, and the API is configured to define a second message of a second message type.

45. The system of claim 40, wherein the API is configured to be generated on a per-message or per-catalog basis.

46. The system of claim 40, wherein the API includes an NPS done API that is configured to be used by the consumer process to return an NPS response message.

47. The system of claim 40, wherein the API includes an NPS set error string API that is configured to send a formatted error string from the consumer process to the producer process.

48. The system of claim 40, wherein the API includes an NPS delete error string API that is configured to be used by the consumer process to delete an error string that was returned from an NPS set.

49. The system of claim 40, wherein the API is configured to be used by a consumer process to retrieve a next record in a message response.

50. The system of claim 40, wherein the message includes an NPS message, the API is configured to be used by a producer to register a producer handler function for a given message.

51. The system of claim 40, wherein the message includes an NPS message, the API is configured to allocate a portion of the memory for a record of a given message type.

52. The system of claim 40, wherein the message includes an NPS message, the API is configured to free a portion of the memory for a record of a given message type.

53. The system of claim 40, wherein the message includes an NPS message, the API is configured to be used by a producer to insert a record into an NPS response message.

54. The system of claim 40, wherein the API is configured to marshall the message at the producer process and unmarshall the message at the consumer process.

* * * * *